United States Patent [19]

Skeirik

[11] Patent Number: 5,058,043

[45] Date of Patent: Oct. 15, 1991

[54] BATCH PROCESS CONTROL USING EXPERT SYSTEMS

[75] Inventor: Richard D. Skeirik, Newark, Del.

[73] Assignee: E. I. du Pont de Nemours & Co. (Inc.), Wilmington, Del.

[21] Appl. No.: 333,536

[22] Filed: Apr. 5, 1989

[51] Int. Cl.$^5$ .............................................. G06F 15/46
[52] U.S. Cl. .................................. 364/550; 364/500; 364/513
[58] Field of Search .................... 364/500, 550, 551.01, 364/513, 300

[56] References Cited

U.S. PATENT DOCUMENTS

| | | | |
|---|---|---|---|
| 4,215,396 | 7/1980 | Henry et al. | 364/136 |
| 4,227,245 | 10/1980 | Edblad et al. | 364/468 |
| 4,563,746 | 1/1986 | Yoshida et al. | 364/492 |
| 4,616,306 | 10/1986 | Kuzma et al. | 364/140 |
| 4,628,434 | 12/1986 | Tashiro et al. | 364/130 |
| 4,628,435 | 12/1986 | Tashiro et al. | 364/130 |
| 4,642,782 | 2/1987 | Kemper et al. | 364/550 |
| 4,644,479 | 2/1987 | Kemper et al. | 364/550 |
| 4,648,044 | 3/1987 | Hardy | 364/513 |
| 4,649,515 | 3/1987 | Thompson et al. | 364/900 |
| 4,656,603 | 4/1987 | Dunn | 364/513 X |
| 4,658,370 | 4/1987 | Erman et al. | 364/513 |
| 4,670,848 | 6/1987 | Schramm | 364/513 |
| 4,672,529 | 6/1987 | Kupersmit | 364/130 |
| 4,713,775 | 12/1987 | Scott et al. | 364/513 |
| 4,736,296 | 4/1988 | Katayama et al. | 364/419 |
| 4,740,886 | 4/1988 | Tanifuji et al. | 364/150 |
| 4,752,889 | 6/1988 | Rappaport et al. | 364/513 |
| 4,754,410 | 6/1988 | Leech et al. | 364/513 |
| 4,783,752 | 11/1988 | Kaplan et al. | 364/513 |
| 4,825,353 | 4/1989 | Jenkins | 364/152 |
| 4,853,175 | 8/1989 | Book, Sr. | 376/216 |

FOREIGN PATENT DOCUMENTS 0213940  3/1987  European Pat. Off. .

OTHER PUBLICATIONS

Bramer, Expert Systems in Business: A British Perspective, *Expert Systems*, vol. 5, No. 2, May 1988.

Knowledge Engineering System, General Description Manual—Oct. 1984.

Davis, Knowledge Acquisition in Rule-Based Systems-Knowledge about Representations as a Basis for System Construction and Hainlenance, *Pattern-Directed Inference Systems.*

Foster, H. et al., The Application of On-Line Expert Systems to Supervisory Process Control, *Measurement and Control*, V21, Jul./Aug. 1988.

Love, J., Trands and Issues in Batch Control, *The Chemical Engineer*, Apr. 1988.

White, D., Development of Technology Transfer and Implementation Strategies for Intelligent Processing of Materials, *Robotics and Computer-Integrated Manufacturing*, V4, #3/4, 1988.

Ionescu et al., Hierarchical Expert System for Process Control, Proc 1988 American Control Conf.

Karasai, G. et al., Knowledge-Based Approach to Real-Time Supervisory Control, Proc 1988 Amer. Control Conf.

(List continued on next page.)

Primary Examiner—Thomas G. Black
Attorney, Agent, or Firm—Sterne, Kessler, Goldstein & Fox

[57] ABSTRACT

Batch process control is improved by defining a step endpoint condition in an expert system knowledge base; using the expert system to monitor for the occurrence of the endpoint in the batch process; and triggering a change in a batch process condition when the endpoint is found. Preferably, the expert system and the batch process condition change are implemented as modules which execute under control of timing and sequencing functions in a supervisory control system, and the change affects a setpoint (or other control objective) in a continuous control system. Multiple instances of modular expert systems allow parallel process units to be easily controlled.

101 Claims, 31 Drawing Sheets

OTHER PUBLICATIONS

Waye, D. et al., SIMSMART for Process and Process Control Optimization: An Application Using the Synthetic Intelligence Approach, AI Papers 1988, Proc. of the Conf. and AI and Simulation, 1988.

Cram, R. S. et al., Expert System Monitoring and Control of a Polymer Plant, IEEE Coloq on Expert Systems in Process Control, 1988.

Shirley, R., Some Lessons Learned Using Expert Systems for Process Control, *IEEE Control Systems Magazine,* V7, #6, Dec. 1987.

Park, J. A., Concurrent Architecture for Real Time Intelligent Process Control, Proceedings of the 1987 Rochester 4th Conference on Comparative Computer Architecture.

Leech, W. J., A Rule-Based Process Control Method with Feedback, ISA Transactions, V26, #2, 1987.

Caplinger, W. H., The Action-Centered Methodology for Knowledge-Based Process Control, First Annual ESD/SMI Expert System Conference and Exposition for Advanced Manufacturing Technology, 1987.

Kryiazis, V., A Knowledge-Based Architecture for Process Control, Proceedings of the Third Annual Artificial Advanced Computer Technology Conf., 1987.

Hawkinson, "A Real Time Expert System for Process Control," 1986, pp. 69-74, AI Applications in Chemistry.

Kane, "AI and Map in the Processing Industries," Jun. 1986, pp. 55-58, Hydrocarbon Processing.

Moore, "Expert Systems in On-Line Process," 7/6/87, pp. 839-867, MIT.

Allard et al., "The Goal/Subgoal Knowledge Representation for Real-Time Process Monitoring," Jul. 1987, pp. 394-398, Proceedings Association of Artificial Intelligence.

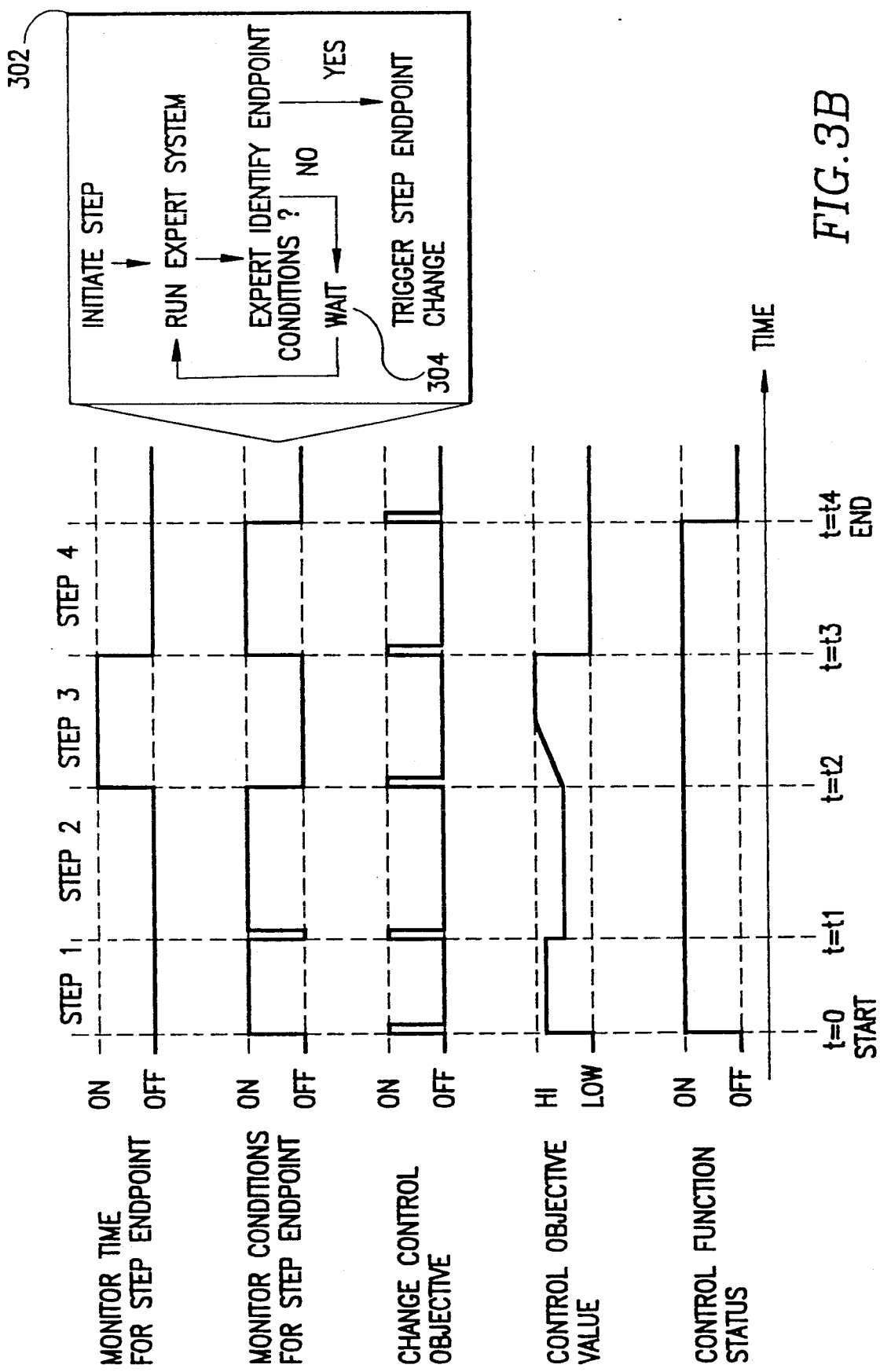

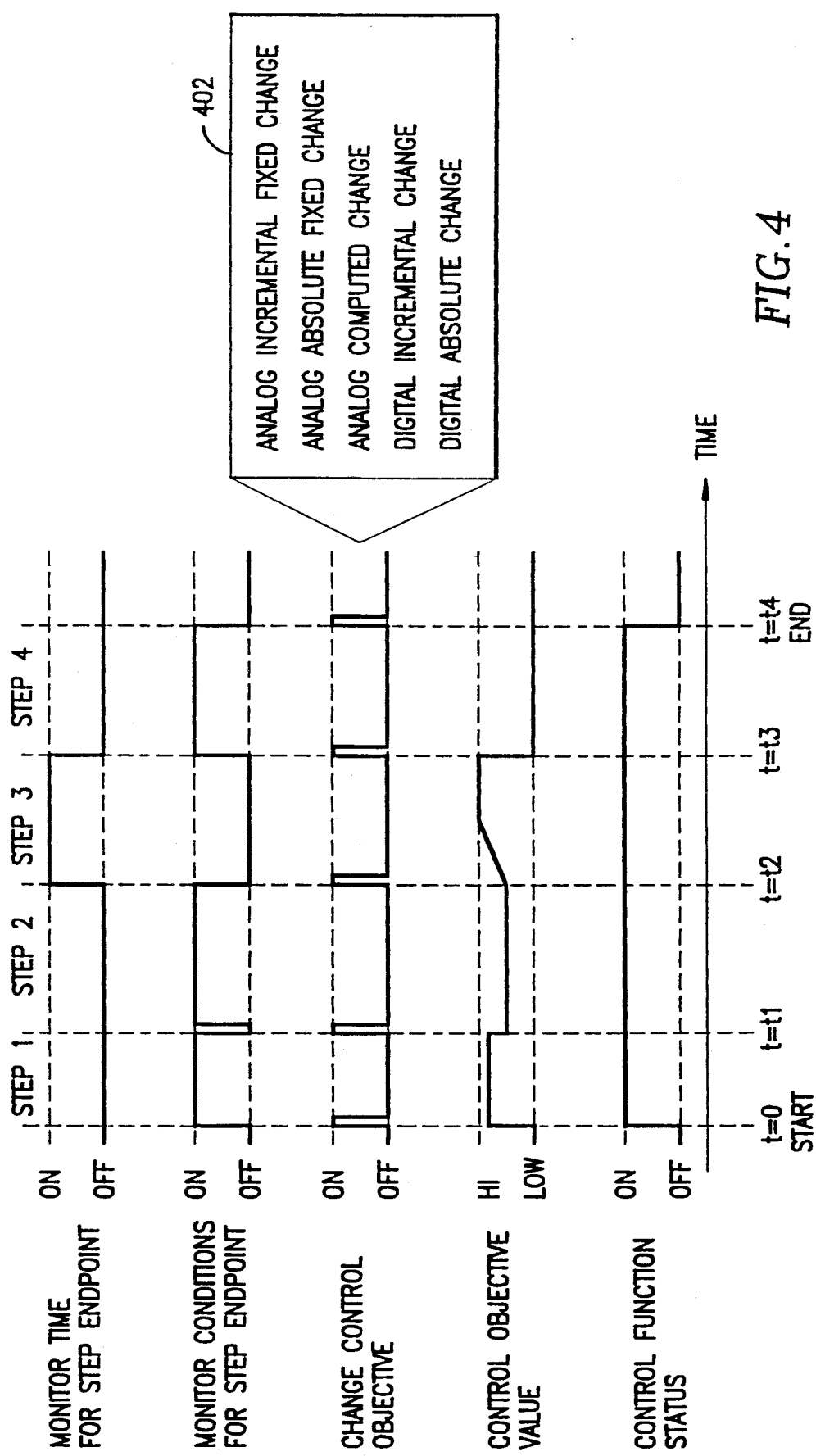

FIG. 20

FIXED EVENT BLOCK                PRESS PF2 TWICE FOR HELP

BLOCK NUMBER : 160
BLOCK TYPE : FIXED EVENT          BLOCK OWNER : SKERIK
BLOCK DESCRIPTION : CONTROL APPLICATION NAME : SIMPLE EXAMPLE APPLICATION

THIS BLOCK SETS UP CONDITIONS FOR THE BEGINNING OF STEP OF THE RECIPE

TIMING OPTION           : 10        FIRST DOMINO
EXECUTION TIME INTERVL  : 10.0000   MINUTES
KEY BLOCK NUMBER        :

EXTERNAL SWITCH TYPE    : 0  NO EXTERNAL SWITCHING          MAN

[MEASURED VAR DATA IS ONLY NEEDED FOR TIMING OPTIONS THAT KEY OFF MEASD VAR.]

MEASURED VAR TYPE  :
MIN VALUE MEAS VAR :
MAX VALUE MEAS VAR :
LOG FILE :

EVENTS TO PERFORM WHEN THIS BLOCK EXECUTES :     TYPE OF      NEW/CHANGE
DATA TYPE                                         CHANGE        VALUE
11   SETPNT OF PM550_01 LOOP #  1  RX1 HTR TEMP    1  ABSOLUT   200.000
32   STATUS OF PACE BLOCK #        161             3  SWITCH    ON

BLOCK STATUS      : INACTIVE

| KEYPAD 7       | KEYPAD 8         | KEYPAD 9     | KEYPAD -   |
| TOGGLE ON\OFF  | NEXT AVAIL BLOCK | TOP OF FORM  | PREV PAGE  |

EXPERT SYSTEM BLOCK　　　PRESS PF2 TWICE FOR HELP

BLOCK NUMBER : 161
BLOCK TYPE : EXPERT SYSTEM　　　BLOCK OWNER : SKEIRIK
BLOCK DESCRIPTION : CONTROL APPLICATION NAME : SIMPLE EXAMPLE APPLICATION
[THIS EXPERT SYSTEM BLOCK MONITORS FOR STEP 1 ENDPOINT, THEN TURNS ON BLOCK 162]

TIMING OPTION : 1　ACTIVATE EVERY FIXED INTERVAL
EXECUTION TIME INTERVL : 2.00000 MINUTES
KEY BLOCK NUMBER :
EXTERNAL SWITCH TYPE : 0　NO EXTERNAL SWITCHING　MAN
[MEASURED VAR DATA IS ONLY NEEDED FOR TIMING OPTIONS THAT KEY OFF MEASD VAR.]
MEASURED VAR TYPE :
MIN VALUE MEAS VAR :
MAX VALUE MEAS VAR :

LOG FILE :
BLOCK STATUS : INACTIVE

| KEYPAD 4 | KEYPAD 7 | KEYPAD 8 | KEYPAD 9 | KEYPAD - |
| EDIT RULEBASE | TOGGLE ON\OFF | NEXT AVAIL BLOCK | TOP OF FORM | PREV PAGE |

FIG.21

FIXED EVENT BLOCK                PRESS PF2 TWICE FOR HELP

BLOCK NUMBER : 162
BLOCK TYPE : FIXED EVENT
BLOCK DESCRIPTION : CONTROL APPLICATION NAME :  SIMPLE EXAMPLE APPLICATION          BLOCK OWNER : SKERIK
[THIS BLOCK TURNS THE HEATER SETPOINT LOW ENOUGH TO SHUT THE HEATER DOWN]

TIMING OPTION       : 0    PROGRAM REQUEST ONLY
EXECUTION TIME INTERVL : 8   MINUTES
KEY BLOCK NUMBER    :

EXTERNAL SWITCH TYPE : 0    NO EXTERNAL SWITCHING           MAN
[MEASURED VAR DATA IS ONLY NEEDED FOR TIMING OPTIONS THAT KEY OFF MEASD VAR.]
MEASURED VAR TYPE :
MIN VALUE MEAS VAR :
MAX VALUE MEAS VAR :
LOG FILE :

EVENTS TO PERFORM WHEN THIS BLOCK EXECUTES :       TYPE OF       NEW/CHANGE
DATA TYPE                                          CHANGE        VALUE
11   SETPNT OF PM550_01 LOOP #    1   RX1 HTR TEMP    1  ABSOLUT    15.0000

BLOCK STATUS : INACTIVE

| KEYPAD 7      | KEYPAD 8          | KEYPAD 9      | KEYPAD –   |
| TOGGLE ON\OFF | NEXT AVAIL BLOCK  | TOP OF FORM   | PREV PAGE  |

FIG. 22

EVENT DATA TYPE

ALLOWED VALUES OF THE EVENT DATA TYPE ON NODE VTACDT ARE:

11 — SETPOINT OF A CONTROL LOOP IN TI PM550_01
12 — SETPOINT OF A CONTROL LOOP IN TI PM550_02
13 — SETPOINT OF A CONTROL LOOP IN TI PM550_03
14 — SETPOINT OF A CONTROL LOOP IN TI PM550_04
15 — SETPOINT OF A CONTROL LOOP IN TI PM550_05
16 — SETPOINT OF A CONTROL LOOP IN TI PM550_06
17 — SETPOINT OF A CONTROL LOOP IN TI PM550_07

31 — PACE FEEDBACK BLOCK GOAL VALUE
32 — PACE BLOCK ON/OFF STATUS

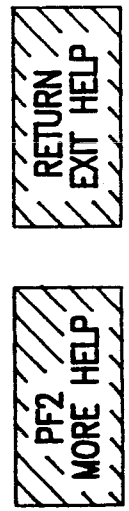

FIG.23

EVENT DATA TYPE—CONTINUED

41 — CURRENT VALUE OF A VANTAGE DATABASE VARIABLE
42 — VALUE OF AN ADDRESS IN VANTAGE EU TABLE DEVICE 1
43 — VALUE OF AN ADDRESS IN VANTAGE EU TABLE DEVICE 2
44 — VALUE OF AN ADDRESS IN VANTAGE EU TABLE DEVICE 3
45 — VALUE OF AN ADDRESS IN VANTAGE EU TABLE DEVICE 4
46 — VALUE OF AN ADDRESS IN VANTAGE EU TABLE DEVICE 5
47 — TARGET VALUE OF A VANTAGE VARIABLE

PRESS PF2 FOR GENERAL INFORMATION ABOUT EVENT DATA TYPES.

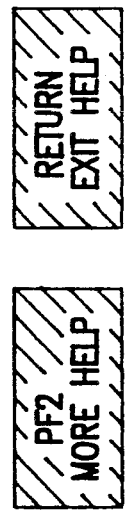

PF2
MORE HELP

RETURN
EXIT HELP

FIG.24

PACE EXPERT SYSTEM BUILDER – PROCESS VARIABLE CALCULATION RULE FORM

RULE NAME : REACTOR_RECYCLE_RATIO

KEY VALUE TO BE TESTED AGAINST LIMITS BELOW: e1  (ENTER V1 OR E1 THRU V10 OR E10)

(STATUS VALUES)
REACTOR_RECYCLE_RATIO
WILL BE:

| | | OPERATOR | LIMIT | | OPERATOR | LIMIT |
|---|---|---|---|---|---|---|
| HIGH_ENOUGH | IF THE KEY VALUE IS | .GT | E2 | | | |
| STILL_LOW | IF THE KEY VALUE IS | .LE | E2 | | | |
| | IF THE KEY VALUE IS | | | AND | | |
| | IF THE KEY VALUE IS | | | AND | | |
| | IF THE KEY VALUE IS | | | AND | | |

LIMIT VALUES MUST EITHER BE VARIABLE VALUES V1 THRU V10 OR CALCULATED VALUES E1 THRU E10.

SPECIFY VARIABLE AND CALCULATED VALUES ON THE NEXT PAGE.

| KEYPAD 8<br>NEXT PAGE | KEYPAD 9<br>TOP OF FORM | KEYPAD –<br>STORE RULE & EXIT |
|---|---|---|
| KEYPAD 7<br>DELETE RULE | KEYPAD 0<br>IGNORE CHANGES & EXIT | KEYPAD<br>LIST RULE NAMES |
| KEYPAD 4<br>COPY A RULE | | |

FIG. 25

PACE EXPERT SYSTEM BUILDER-PROCESS VARIABLE RULE FORM

RULE NAME : AVERAGE_REACTOR_TEMP

DATA TYPE : 2 TIME WT AVG VANT VAR # 320 RX2 1 IN DEG C
RETRIEVAL TIME INTERVAL : 0 00:30:00 (USE ONLY FOR HISTORICAL DATA TYPES)
OLDEST ALLOWABLE AGE : (OPTIONAL)

(STATUS VALUES)
AVERAGE_REACTOR_TEMP

WILL BE :
OK_FOR_30_MINUTES    IF THE DATA VALUE IS   OPERATOR  LIMIT
NOT_READY_YET        IF THE DATA VALUE IS   GT        195.000
                     IF THE DATA VALUE IS   LE        195.000   OPERATOR  LIMIT
                     IF THE DATA VALUE IS                       AND
                     IF THE DATA VALUE IS                       AND
                                                                AND

| KEYPAD 7 | KEYPAD 9 | KEYPAD — |
| DELETE RULE | TOP OF FORM | STORE RULE & EXIT |
| KEYPAD 4 | KEYPAD 0 | KEYPAD . |
| COPY A RULE | IGNORE CHANGES & EXIT | LIST RULE NAMES |

*FIG.27*

PACE EXPERT SYSTEM BUILDER — ANALYSIS RULE FORM

RULE NAME : STEP_1_ENDPOINT_CHECK

THE CONDITION : STEP_1    WILL BE : AT_ITS_ENDPOINT

IF THE FOLLOWING CONDITIONS ARE TRUE:

| VARIABLE/CALCUL RULE NAME OR ANALYSIS CONDITION NAME | IS/WAS | (NOT) | STATUS VALUE |
|---|---|---|---|
| AVERAGE_REACTOR_TEMP | IS | | OK_FOR_30_MINUTES |
| REACTOR_RECYCLE_RATIO | IS | | HIGH_ENOUGH |

AND
AND
AND
AND

KEYPAD 7
DELETE RULE

KEYPAD 9
TOP OF FORM

KEYPAD —
STORE RULE & EXIT

KEYPAD 4
COPY A RULE

KEYPAD 0
IGNORE CHANGES & EXIT

KEYPAD ,
LIST RULE NAMES

FIG. 28

PACE EXPERT SYSTEM BUILDER – ACTION RULE FORM

RULE NAME : TURN_OFF_THIS_BLOCK

IF:

VAR/CALC RULE NAME OR
ANALYSIS CONDITION NAME        STATUS VALUE
STEP_1           IS      AT_ITS_ENDPOINT

PERFORM THIS ACTION:

ACTION TYPE : 1   EXECUTE A FORTRAN STATEMENT (CAN BE A FUNCTION/SUBROUTINE CA

EXECUTABLE FORTRAN STATEMENT:
PACE_STAUTE = PACE_TOGGLE_BLOCK ( 161 , "OFF" )

| KEYPAD 7 DELETE RULE | KEYPAD 8 EDIT MAIL MSG | KEYPAD 9 TOP OF FORM | KEYPAD – STORE RULE & EXIT |
| KEYPAD 4 COPY A RULE | | KEYPAD 0 IGNORE CHANGES & EXIT | KEYPAD , LIST RULE NAMES |

FIG.29

PACE EXPERT SYSTEM BUILDER — ACTION RULE FORM

RULE NAME : EXECUTE_BLOCK_162

IF:

VAR/CALC RULE NAME OR
ANALYSIS CONDITION NAME          STATUS VALUE
STEP_1                    IS     AT_ITS_ENDPOINT

PERFORM THIS ACTION:

ACTION TYPE : 1   EXECUTE A FORTRAN STATEMENT (CAN BE A FUNCTION/SUBROUTINE CA

EXECUTABLE FORTRAN STATEMENT:
PACE_STATUS = PACE_EXECUTE_BLOCK ( 162 )

KEYPAD 7
DELETE RULE

KEYPAD 4
COPY A RULE

KEYPAD 8
EDIT MAIL MSG

KEYPAD 9
TOP OF FORM

KEYPAD 0
IGNORE CHANGES & EXIT

KEYPAD —
STORE RULE & EXIT

KEYPAD ,
LIST RULE NAMES

FIG. 30

BATCH PROCESS CONTROL USING EXPERT SYSTEMS

BACKGROUND OF THE INVENTION

1. Field of the Invention

The present invention relates generally to monitoring and control of batch processes, particularly chemical processes, and more specifically to expert systems used in batch process control.

2. Associated Applications

The present application is associated with the following United States Patents and Patent Applications (and all non-U.S. patent applications claiming priority therefrom) as follows:
 (1) U.S. Pat. No. 4,920,499, issued Apr. 24, 1990
 (2) U.S. Pat. No. 4,884,217, issued Nov. 28, 1990
 (3) Allowed U.S. patent application, Ser. No. 103,014, filed Sept. 30, 1987
 (4) U.S. Pat. No. 4,907,167, issued Mar. 6, 1990
 (5) Allowed U.S. patent application, Ser. No. 103,047, filed Sept. 30, 1987
 (6) U.S. Pat. No. 4,910,691, issued Mar. 20, 1990

Each of these Patents and Patent applications, as well as any corresponding non-U.S. applications and/or patents is incorporated herein in its entirety.

3. Related Art a. Batch Processes

A batch process is operated by moving the process through a set of steps. Each step requires different conditions in the process, and usually follows a pre-defined sequence or recipe.

Cooking is a typical batch process. The cooking recipe specifies process conditions during each step of the batch process (for example, oven temperature), as well as criteria for determining when the step has ended or been completed (for example, simmer for 20 minutes).

A "true" or "classic" batch process begins at one point in time with ingredients or raw materials, and finishes later in time with final products. Such true or classic batch processes are used to make many valuable products, including, for example, pharmaceuticals and pesticides.

Also, some very important "continuous" processes, such as the refining of crude oil, use a repetitive cycle of steps, which cycle of steps is similar to a batch process. Moreover, all continuous processes use a sequence of steps to start the continuous process up and to shut the process down. These start up and shut down portions of such continuous processes constitute individual batch processes.

Thus, it can be appreciated that batch processes and batch processing play a very important role in all manufacturing, even in nominally continuous processes.

b. Batch Process Control

Batch process control is used to automate the operation of batch processes. To control a batch process, two basic functions are needed.

First, during each step, a batch process condition(s) must be maintained as close as possible to the desired condition(s) for that step. As used herein, the specification of the desired process condition(s) is referred to as the "control objective(s)". The inventor believes that maintaining control objectives of a batch process usually requires the methods and functions of a continuous process control system. Some typical, conventional means or ways of providing continuous process control functions are distributed control systems and single loops controllers, as described below.

The second basic function is that a batch process control system must be able to determine when to change steps during the batch process. It must also be able to change control objectives to the values required by the next step of the batch process. As used herein, when a step of a batch process is over, we say the step has reached its "endpoint."

A general discussion of batch process control, and the control systems which provide batch process control, is found in *Batch Process Automation*, by Howard P. Rosenoff and Asish Ghosh, Van Nostrand Reinhold Co., New York, 1987 which is incorporated herein in its entirety.

c. Endpoints in Batch Processes

An endpoint of a batch process is usually defined either by time or by process conditions.

A time endpoint is defined as the amount of time a step is to take or last. It is analogous to the cooking time for a soup. A batch process recipe defines how long the step is to last in time. When that time has elapsed, the step is over. In other words, the step has reached its endpoint. At this point, conditions need to be changed to the next step of the batch process. For example, continuing the cooking analogy, the next step of preparing the soup would be turning the stove off.

An endpoint can also be defined by one or more process conditions.

A process condition endpoint is the condition(s) that the batch process must obtain or meet in order for the step to be over or completed. Continuing the cooking analogy, this is analogous to baking a cake until a toothpick comes out clean. The amount of time required to complete the step may vary, but the step is over when that process condition(s) is satisfied or met. In the cake analogy, when the endpoint is detected by the toothpick test, conditions need to be changed by taking the baked cake out of the oven and turning the oven off.

Endpoint detection and/or timing in batch processes has been automated for many years using mechanical devices such as drum timers and relays. Simple process condition endpoints can be detected, for example, using a limit switch which is set to trip when a tank is 90% full. These functions are now primarily done by computer-based programmable logic controllers (called PLCs). Some PLC's can detect batch process endpoints when an analog input value crosses a limit threshold. Although current PLCs are often based on powerful microcomputers, their functions are still generally designed to emulate the mechanical devices which preceded them. This conventional approach tends to limit the methods of endpoint detection and/or timing to rather simple definitions of the endpoint.

In many batch processes, however, step endpoints cannot be determined using usch simple definitions. For example, a step in a process may not end until a complex endpoint definition made up of several elapsed times or conditions have been met. For example, this may occur when a feed tank has filled, the temperature has risen to its set point and has remained there for some predetermined time, and the next tank has emptied.

In particular, to start-up a large (and expensive) nominally continuous process, fairly complex conditions often need to be satisfied before the next start-up step can be entered. Detecting these more complex endpoint definitions has generally required people (called process operators) to look at and evaluate the condition(s) in the process. The inventor believes that an effective way to automate the end point detection would be very valuable and would significantly advance the present state of the art of batch process control technology.

d. Changing steps in a batch process

The second function of a batch process control system is to make changes in control objectives once a step endpoint is reached.

Control objectives can be "analog" values, like a controller setpoint or gain constant. The most common change made to an analog value is an absolute change, in which the value is set to some pre-defined absolute number. In the cooking situation, this is analogous to setting the oven temperature to 350 degrees.

Analog values can also be incrementally changed, by adding a fixed amount to their current value. In the cooking situation, this is analogous to turning the oven temperature down by 20 degrees.

Control objectives can also be defined for "digital" (on-off) values, which only have two (binary) states. Examples are on/off switches, valves that open or close, and so on.

As used herein, the ordered collection of the changes needed at the beginning of each step, and the endpoint definitions for each step, form or constitute a "recipe" or "sequence" for a batch process.

e. Changing Control Objectives

Batch process control systems can change control objectives. However, such conventional process control systems are generally limited in the way changes can be defined and implemented. Of the conventional systems, the most common is the PLC. PLCs are reliable and easy to use, but their functionality is usually very strictly defined.

Some higher level batch control systems allow batch process recipes to be defined with setpoint changes. These kinds of systems are generally regulatory. Thus, they cannot handle changes in supervisory control strategies that might be controlling very important product properties.

f. Maintaining Control Objectives

Process conditions of a step of a batch process can be maintained at or close to control objectives using conventional control systems. Two common forms are distributed control systems (called DCSs), which often implement feedback control loops, and single loop controllers. Some PLCs also provide the functions of conventional control systems. DCSs and PLCs with control loops provide simple regulatory feedback control, in which temperatures, pressures, and flow rates are maintained as close as possible to goal or setpoint values.

The inventor has found that a batch process may require more than simple regulatory control. For example, the operation of a process unit during a step may require complex control. Or a composition or intermediate property may need to be held at a statistically stable value. These kinds of control problems can be too complex for conventional regulatory control systems.

There are serious deficiencies in the present art for controlling batch processes. Among these are the following.

First, because of the limitations of current batch control systems, it is very difficult, if not impossible, to automate the detection of step endpoints with complex definitions. Current control systems in both process applications are especially limited in their ability to detect endpoints which include time history conditions.

Second, because current batch control systems are regulatory systems, it is very difficult to use complex control during a batch step. In particular, it is difficult if not impossible to automate the use of statistical process control or expert system based control during batch steps.

These and other deficiencies in the conventional technology are significantly overcome by the present invention.

II. SUMMARY OF THE INVENTION

Batch process control is improved by defining a step endpoint condition in an expert system knowledge base; using the expert system to monitor for the occurrence of the endpoint in the batch process; and triggering a change in a batch process condition when the endpoint is found. Preferably, the expert system and the batch process condition change are implemented as modules which execute under control of timing and sequencing functions in a supervisory control system, and the changes affect setpoints (or other control objectives) in a continuous control system. Multiple instances of modular expert systems allow parallel process units to be easily controlled.

IV. BRIEF DESCRIPTION OF THE DRAWINGS

The present invention as described in the specification is better understood with reference to the following drawings.

FIG. 3B shows the time history of the expert system based batch process control method of the present invention for a multi-step process including both time and expert system-based endpoint determination, with an example of the method of determining endpoint by expert system shown in detail, when the horizontal axis represents time.

FIG. 4 shows the time history of the expert system based batch process control method of the present invention for a multi-step process including both time and expert system-based endpoint determination, with examples of how control objectives can be changed, where the horizontal axis represents time.

FIG. 20 shows a computer display template for the first event module of the present invention used in the example application.

FIG. 21 shows the template for the expert system module of the present invention used in the example application.

FIG. 22 shows the template for the second event module of the present invention used in the example application.

FIGS. 23 and 24 show the help screens listing the allowed event data types for the event modules of the present invention in the example application.

FIG. 25 and 26 show the templates in accordance with the present invention for the calculation rule which classifies the reactor recycle ratio in the example application.

FIG. 27 shows the template in accordance with the present invention for the variable rule which classifies the average reactor temperature in the example application.

FIG. 28 shows the template in accordance with the present invention for the analysis rule which determines the endpoint condition in the example application.

FIG. 29 shows the template in accordance with the present invention for the action rule which turns off the expert system block when the endpoint is detected in the example application.

FIG. 30 shows the template in accordance with the present invention for the action rule which requests the execution of the second event block when the endpoint is detected in the example application.

DETAILED DESCRIPTION OF THE PREFERRED EMBODIMENTS

Table of Contents

I. General Overview of the Inventions
   1. Expert System Based Batch Process Control Method
      a. Initiating the Step
      b. Expert System
      c. Monitoring
      d. Changing Control Objectives
   2. Expert System Based Batch Process Control System
      a. Process Controller
      b. Control Objectives
      c. Expert System
      d. Endpoint Condition
   3. Batch Control System with Expert Subprocedures
   4. Modular Supervisory Sequence Control Method
      a. Initiating the Step
      b. Repeatedly Running Expert System
      c. Testing for an Endpoint Condition
      d. Executing Event Modules
   5. Modular Batch Supervisory Process Control System
      a. Timing and Sequencing Functions
      b. Event Modules
      c. Expert System Modules
   6. Modular Expert System with Multiple Instances
II. DETAILED DESCRIPTION
   1. Batch Processes
   2. Control Means
   3. Control Objectives
   4. Expert Systems
      a. Components of an Expert Systems Environment
      b. Batch Control Needs
      c. Expert System Modules
   5. Sequence Controller
III. Modular Batch Supervisor
   1. Modules a. Generic Modules
b. Custom modules
2. Event Module
3. Expert System Module
4. Other Module Types
5. Real-Time Control Program
   a. Timing and Sequencing Functions
6. Shared Memory Area
7. Build-Supervisor
8. Build-Expert
9. Temporal Knowledge Representations
   a. Is/Was in Analysis Rules
   b. Last Cycle Time
10. Build User Program
11. Procedure Library
12. An Example Application in the Batch Supervisor IV. SOFTWARE TECHNIQUES FOR IMPLEMENTING THE BATCH SUPERVISOR
1. Shared Memory Area
2. Contents of the Shared Memory Area
3. Shared Memory Services
4. Retrieval Services
5. Shared Service Image
6. Site Specific External System Support
7. Block Types and Timing Function Types
8. Block Status
9. Real-time Control Program
10. Build-Supervisor Program
11. Build-Expert Program
12. Build-User Program Environment
13. User Sharable Image

I. General Overview of the Inventions

The present invention as described in this application comprise methods and systems inventions for controlling batch processes using expert systems and expert system methods.

1. Expert System Based Batch Process Control Method

Figure 1:
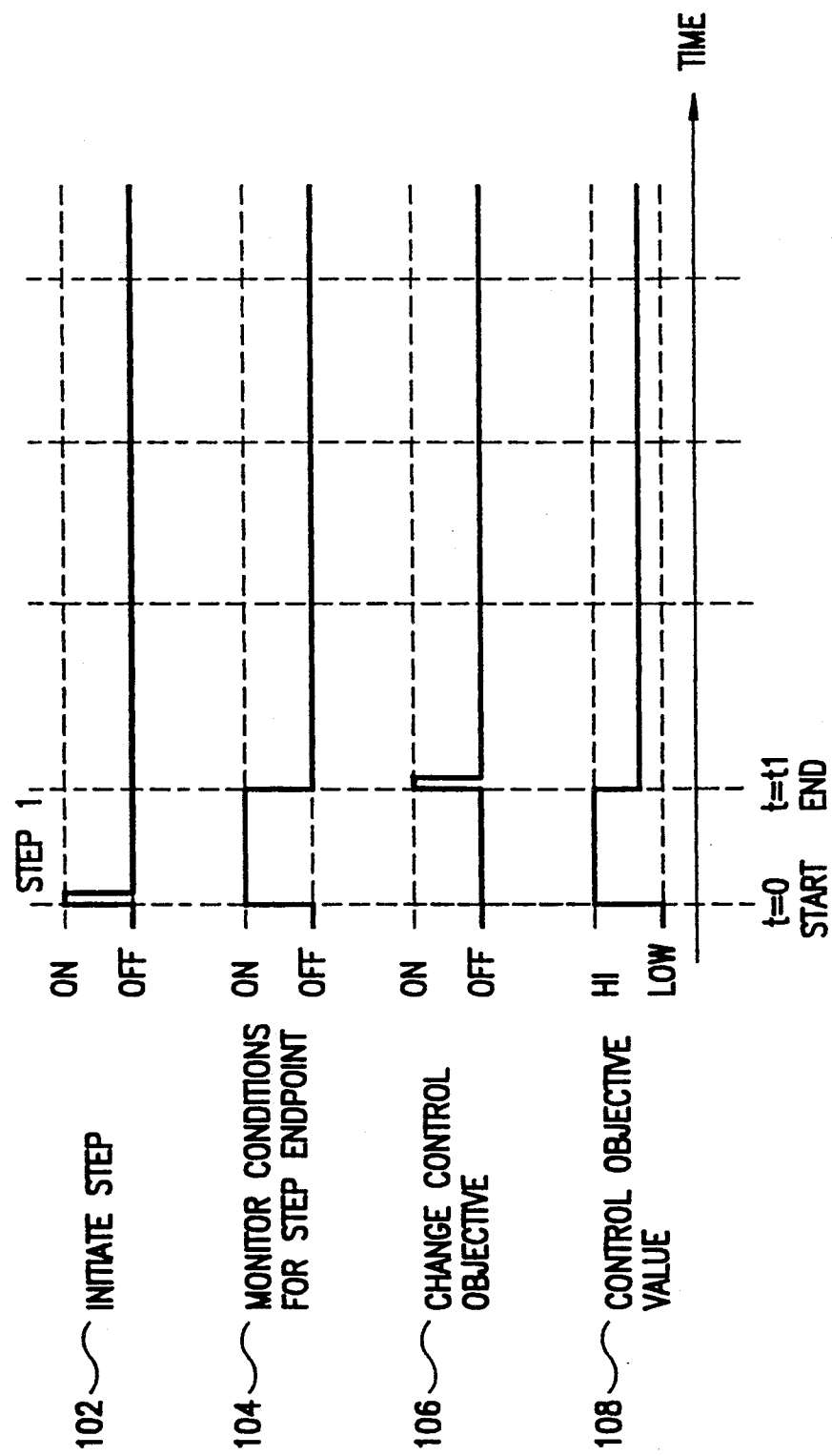
FIG. 1 shows the time history of using the expert system based batch process control method of the present invention, where th horizontal axis represents time.
Figure 2:
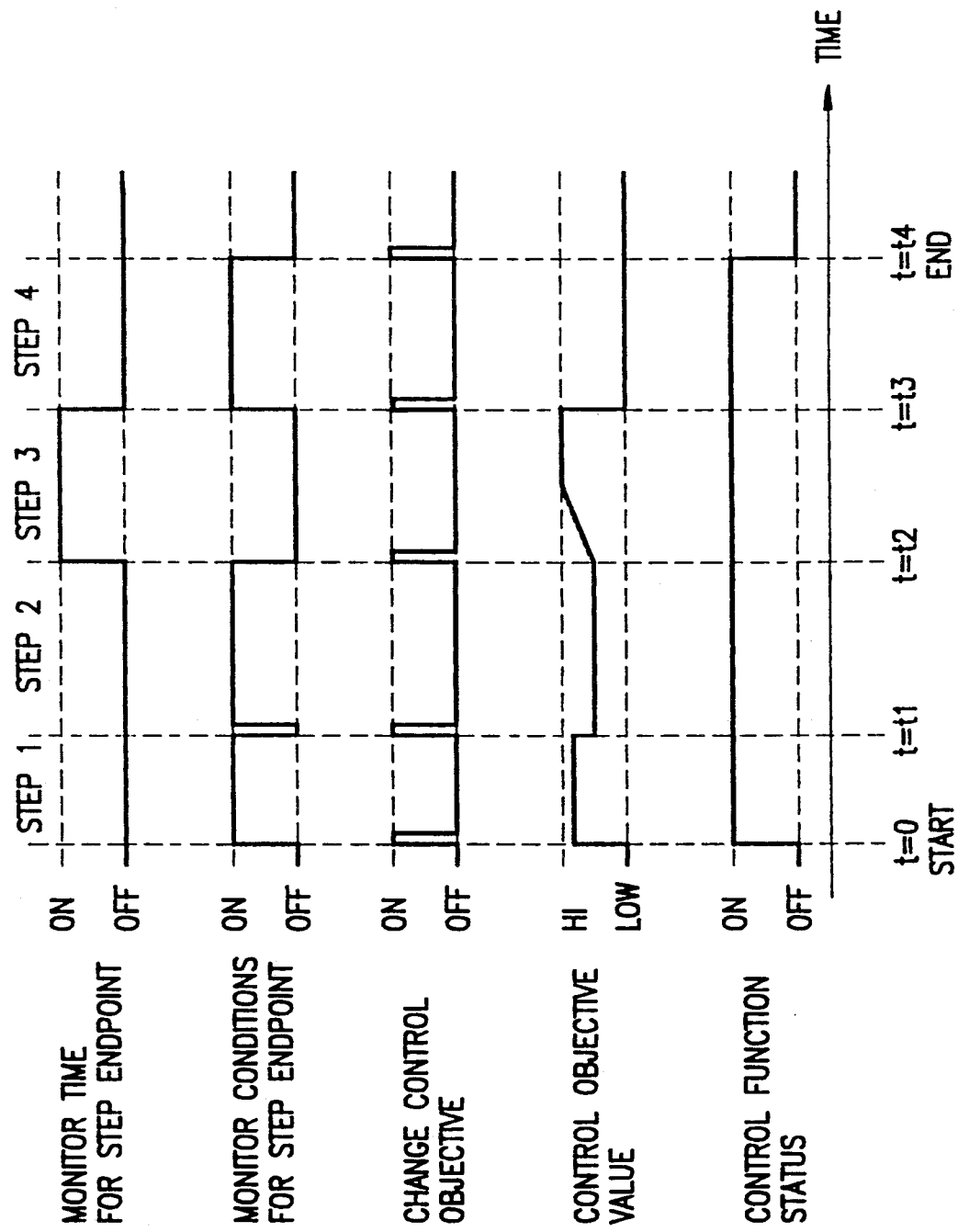
FIG. 2 shows the time history of the expert system based batch process control method of the present invention for a multi-step process including both time and expert system-based endpoint determination, where the horizontal axis represents time.

Referring now to FIG. 1, one aspect of the present invention is a method of using an expert system to identify the endpoint in a batch process step. This method of the present invention operates as follows: (a) first, the batch process step is initiated, as shown by plot 102. Then, (b) an expert system of the present invention is used to (c) monitor for the endpoint condition of the batch process, as shown by plot 104. Last, (d) a control objective as shown by plot 108 in the batch process is changed as shown by plot 106 when the expert system detects the endpoint condition. It should be noted that plots 102, 104, 106, and 108 of FIG. 1 shown only an illustrative example of this method of the present invention; in other words, this method of the present invention is not limited to that shown in FIG. 1.

This method of the present invention is described in greater detail below:

a. Initiating the Step

Referring again to plot 102, if the batch process step is the first step in the process, it is probably initiated manually by a person (process operator, which is not shown). A push button or a computer command could be used to do this initiation. If the batch process step is not the first step in the batch process, it typically would be initiated automatically when the previous step reached its endpoint. Thus, the present invention contemplates all presently known or future developed ways to initiate the step.

b. Expert System

Figure 9:
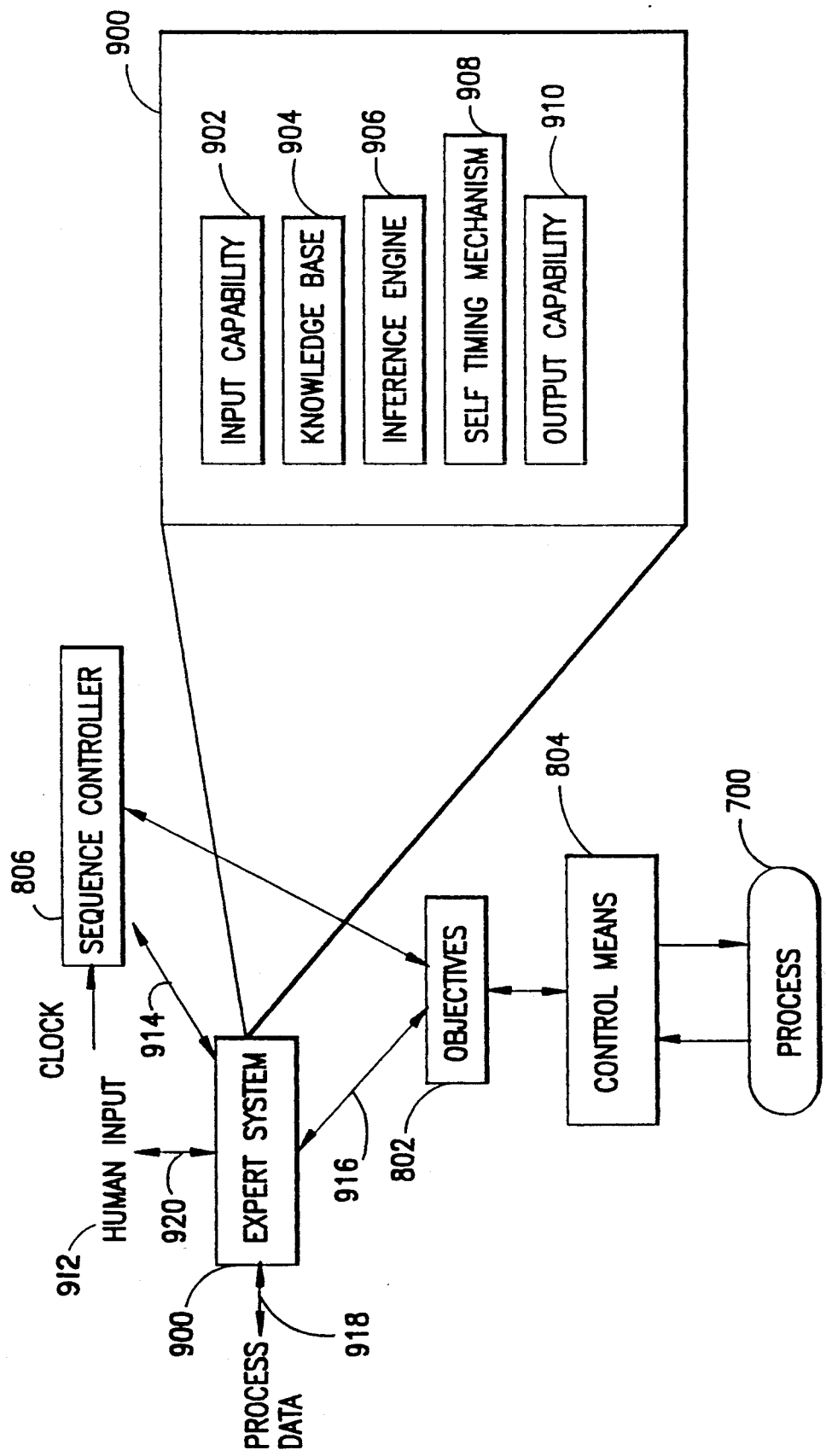
FIG. 9 shows a simple block diagram of the expert system based batch process control system of the present invention including a sequence controller, showing examples of the components of the expert system.
Figure 10:
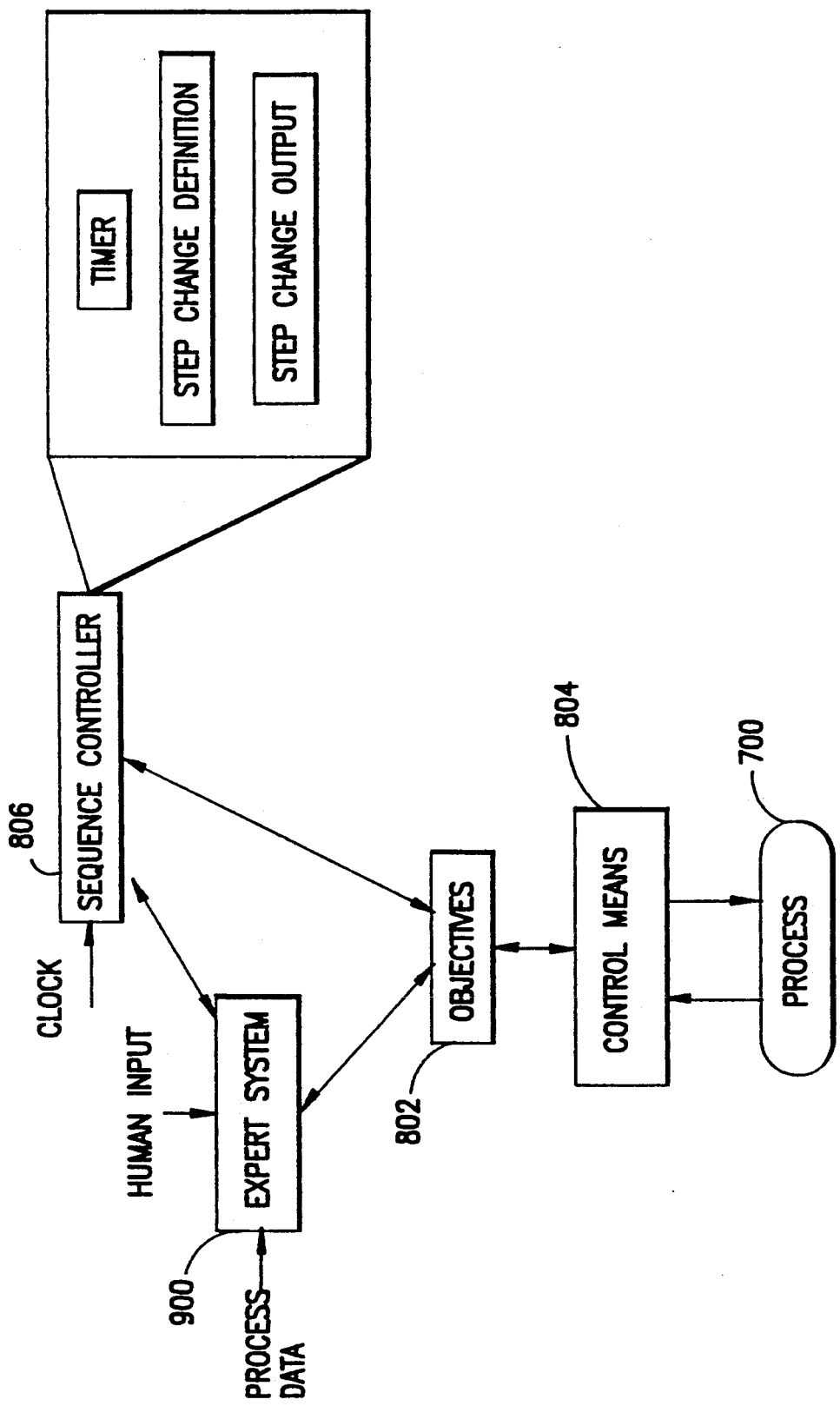
FIG. 10 shows a simple block diagram of the expert system based batch process control system of the present invention including a sequence controller, showing examples of the components of the sequence controller.
Figure 17:
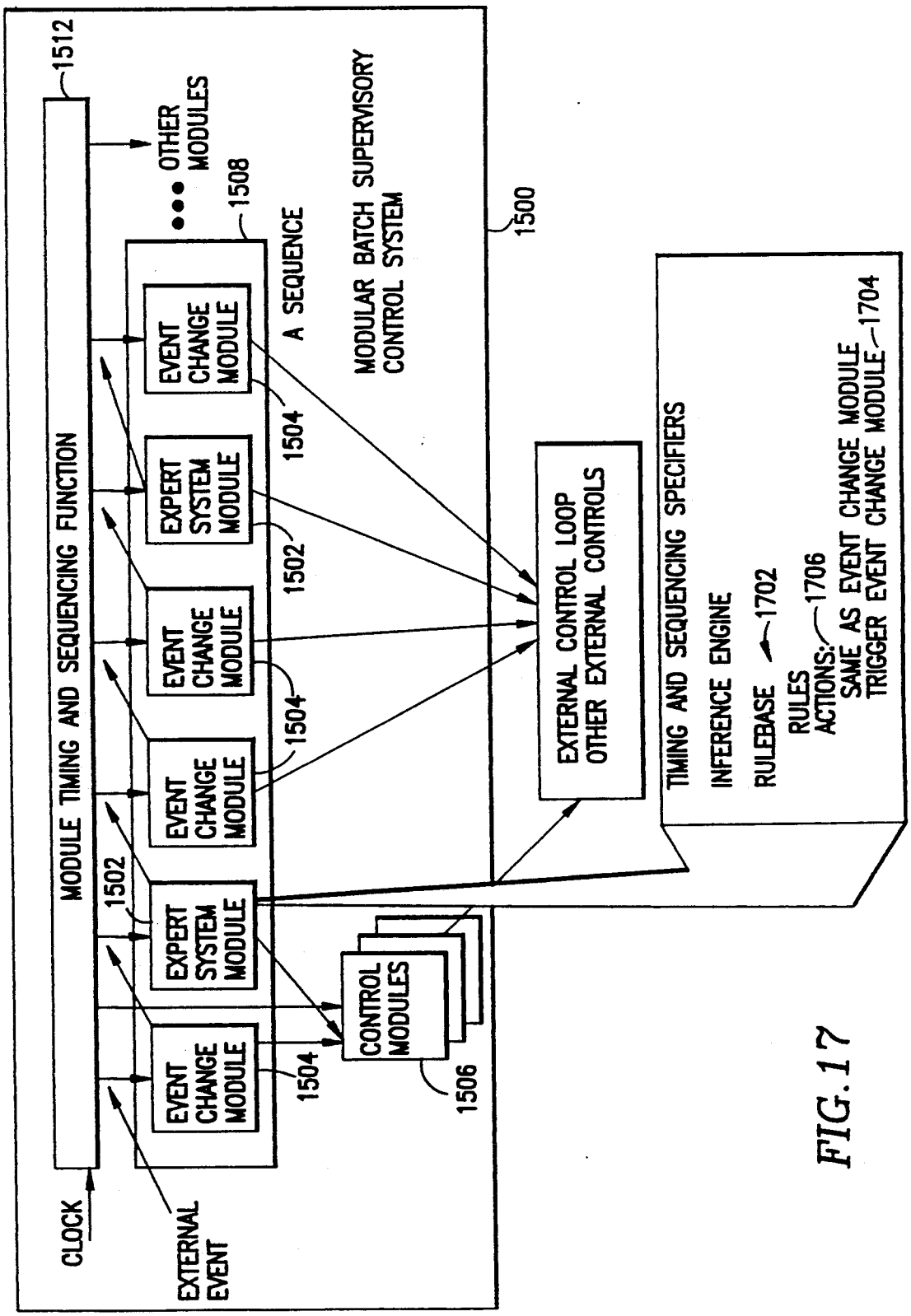
FIG. 17 shows an example of a sequence implemented in the modular supervisory sequence control system of the present invention, using other control modules, showing examples of the components of the expert system module.

Expert systems (see generally FIG. 9) of the present invention provide two generic functions: an inference engine 906, and interfaces 902, 910 to communicate data to and from people (indicated generally by reference numeral 912) and other systems including computer systems as shown by communications links 914, 916, 918. These two functions are used to process knowledge, represented in a structured way (a rule base example is shown in FIG. 17 at reference numeral 1702) in a knowledge base 904, to make decisions. The decisions are then implemented by communicating with people 912 or by taking actions outside the expert system (see links 914, 916, 918). Most expert systems use rules (see reference number 1702) to represent knowledge. Some expert systems group rules around classes of objects (not shown, but known well in the expert system art). It should be understood, however, that the present invention contemplates all presently known and future developed knowledge representations.

A batch process control expert system of the present invention preferably should have a knowledge representation (not shown) that can express the retrieval of process measurements, the temporal representation of that data, and perhaps some statistical processing of the data. In the preferred embodiment, this kind of knowledge representation as used by the present invention allows the knowledge base 904 to express the process condition(s) that define a typical batch endpoint condition(s), as represented by block 702 of FIG. 7.

c. Monitoring

Since the expert system(s) of the present invention runs on a computer (not shown, but any type of presently known or future developed computer or processor can be used), it is fundamentally procedural. To monitor using an expert system 900 (which is fundamentally procedural) the expert system 900 must continue to monitor over time. One way to do this according to the present invention is to have the expert system 900 cycle (run) continuously until it detects the endpoint condition. Assuming the knowledge representation and/or the inference engine 906 of the expert system 900 allows for such cycling, this can be accomplished within the expert system 900. That is, the expert system 900 never need return control to that computer function that started it. This approach is called a cycling rule base.

Figure 3A:
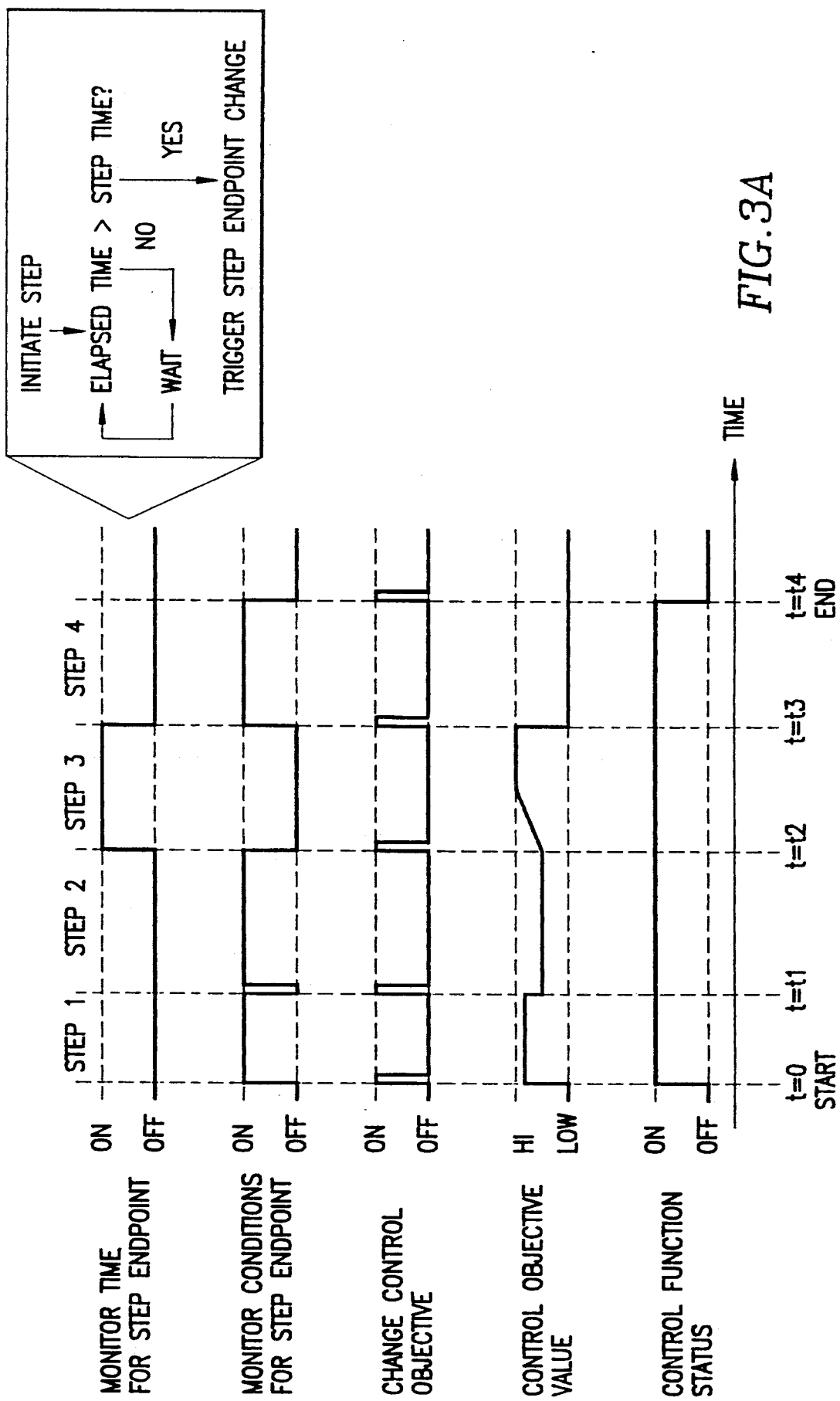
FIG. 3A shows the time history of the expert system based batch process control method of the present invention for a multi-step process including both time and expert system-based endpoint determination, with an example of the method of determining endpoint by time shown in detail, where the horizontal axis represents time.
Figure 19:
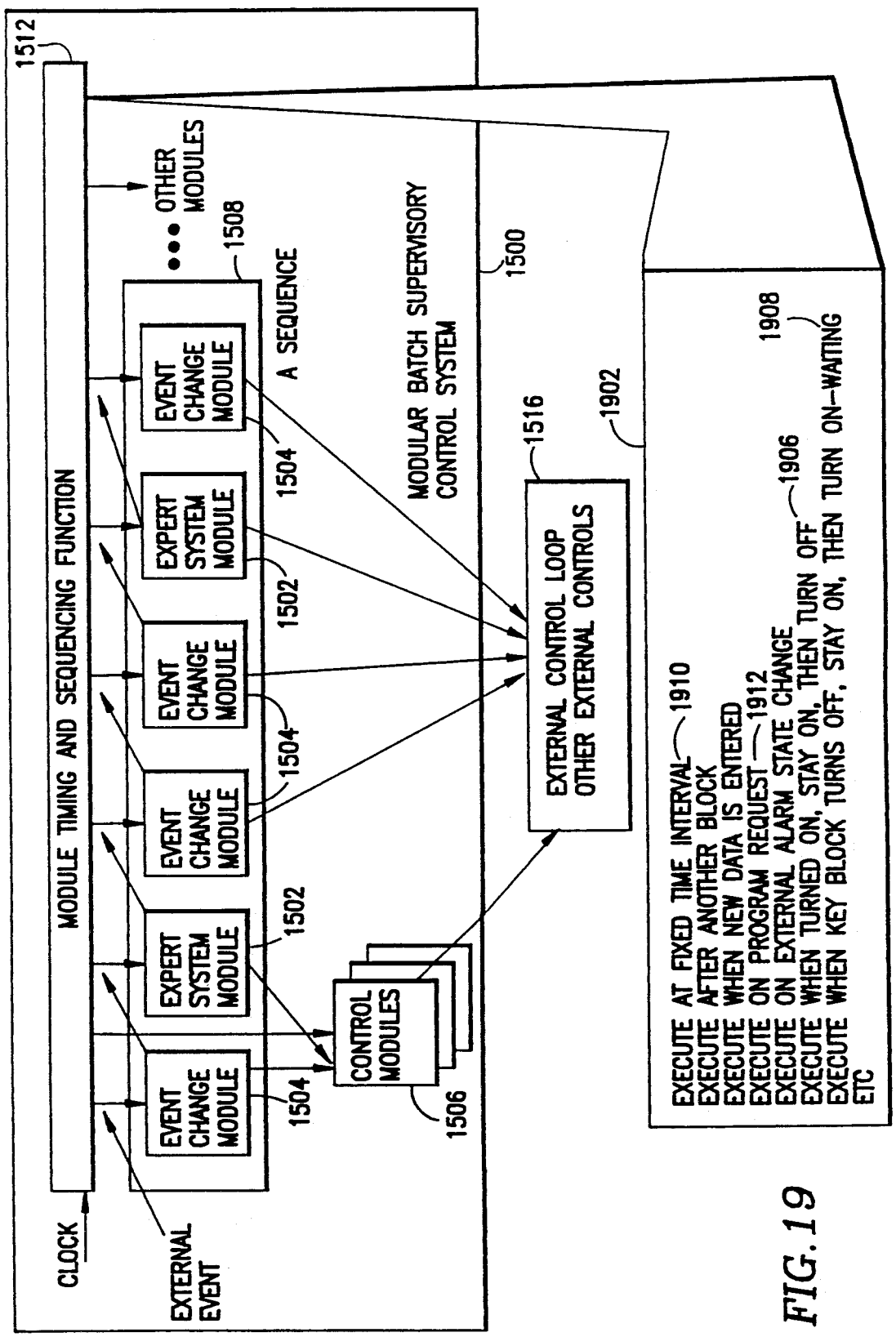
FIG. 19 shows an example of a sequence implemented in the modular supervisory sequence control system of the present invention, using other control modules, with examples of the types of timing functions that could be used.

Another way to repeat (or cycle) the expert system 900 in accordance with the present invention is to allow some idle time (as produced by the wait step 304 of FIG. 3B, for example) between executions of the expert system 900. This idling approach makes sense if the expert system 900 runs fast compared to the speed at which the batch process changes. To implement this idle approach, a timing or trigger mechanism (an example for the modular batch supervisory process control system embodiment (the "batch supervisor") is shown in box 1902 of module timing and sequencing function 1904 of FIG. 19) is needed to start the next run of the expert system 900. In this case, the computer of the present invention can do other things between runs of the expert system 900.

d. Changing Control Objectives

Figure 8:
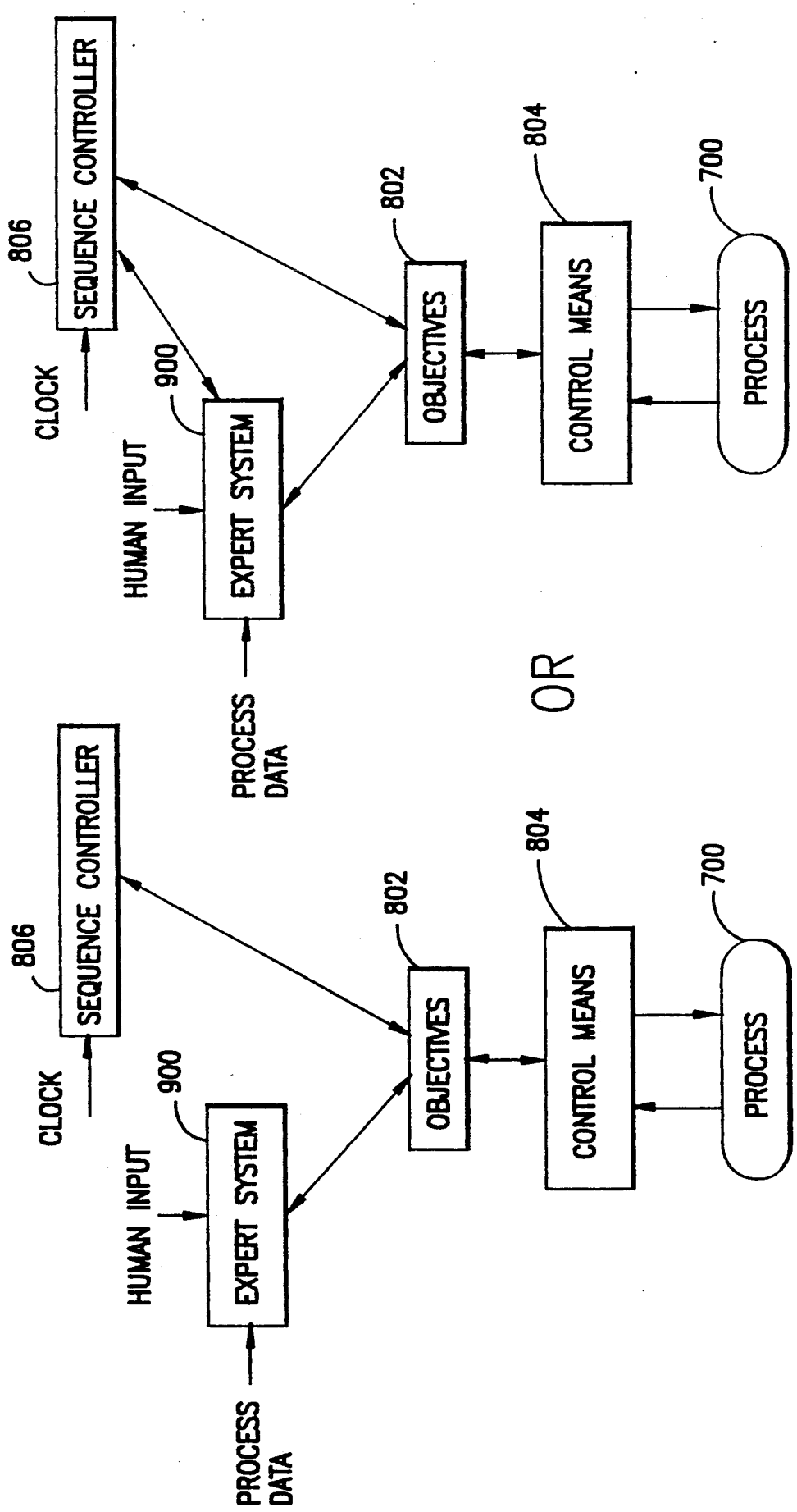
FIG. 8 shows two simple block diagrams of the expert system based batch process control system of the present invention including a sequence controller.

When the expert system 900 of the present invention detects the endpoint condition, it must somehow cause process control objectives (see block 802 of FIG. 8) to change (examples of such changes are seen in block 402 of FIG. 4). (Examples of specific control objectives are shown in block 502 of FIG. 5, and examples of classes of control objectives are shown in block 1102 of FIG. 11). One way this is done in the present invention is to encode the changes to be made to the objectives directly in the expert system knowledge base 904. In this case, the interface functions 902, 910 in the expert system 900 of the present invention must be able to communicate these control objective 802 changes directly to their destination such as a control means 804. If the destination is a DCS or PLC, then the expert system 900 changes the setpoint or logic values in these systems.

Another way the expert system 900 of the present invention can trigger a change in control objectives 802 is to ask a batch-type (sequence) control system 806 to execute a pre-defined step change. With this approach, the expert system 900 needs the interface capability 910 to send a trigger message (via link 914) to the batch control system 806, and the control system 806 must be able to accept such a trigger message.

A third option is for the expert system 900 to communicate with people 912 (process operator), who can then manually change conditions, or manually trigger a batch-type control system 806.

It should be understood that in a multi-step batch process, the changing of the control objective (plot 106) for a step n is the same thing as the initiation (plot 102) of step n+1.

2. Expert System Based Batch Process Control System

Figure 7:
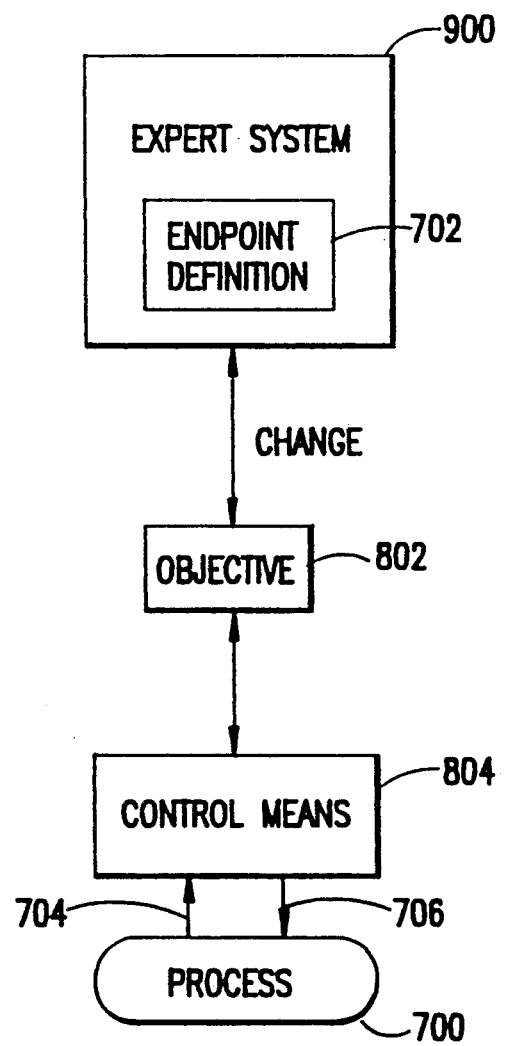
FIG. 7 shows a simple block diagram of the expert system based batch process control system of the present invention.

Referring now to FIG. 7, in one aspect the expert system based batch process control method of the present invention can be implemented with a process controller 804 which can control the process 700 to try meet control objectives 802, and an expert system 900 which can detect conditions that match a defined endpoint condition 702 and change the control objectives 802 of the process controller 804.

This aspect of the present invention is described in greater detail below:

a. Process Controller

The process controller (control means) 804 can be, for example, any of the regulatory control devices mentioned above (such as DCS, PLC), and other devices such as a single loop controller.

b. Control Objectives

Figure 5:
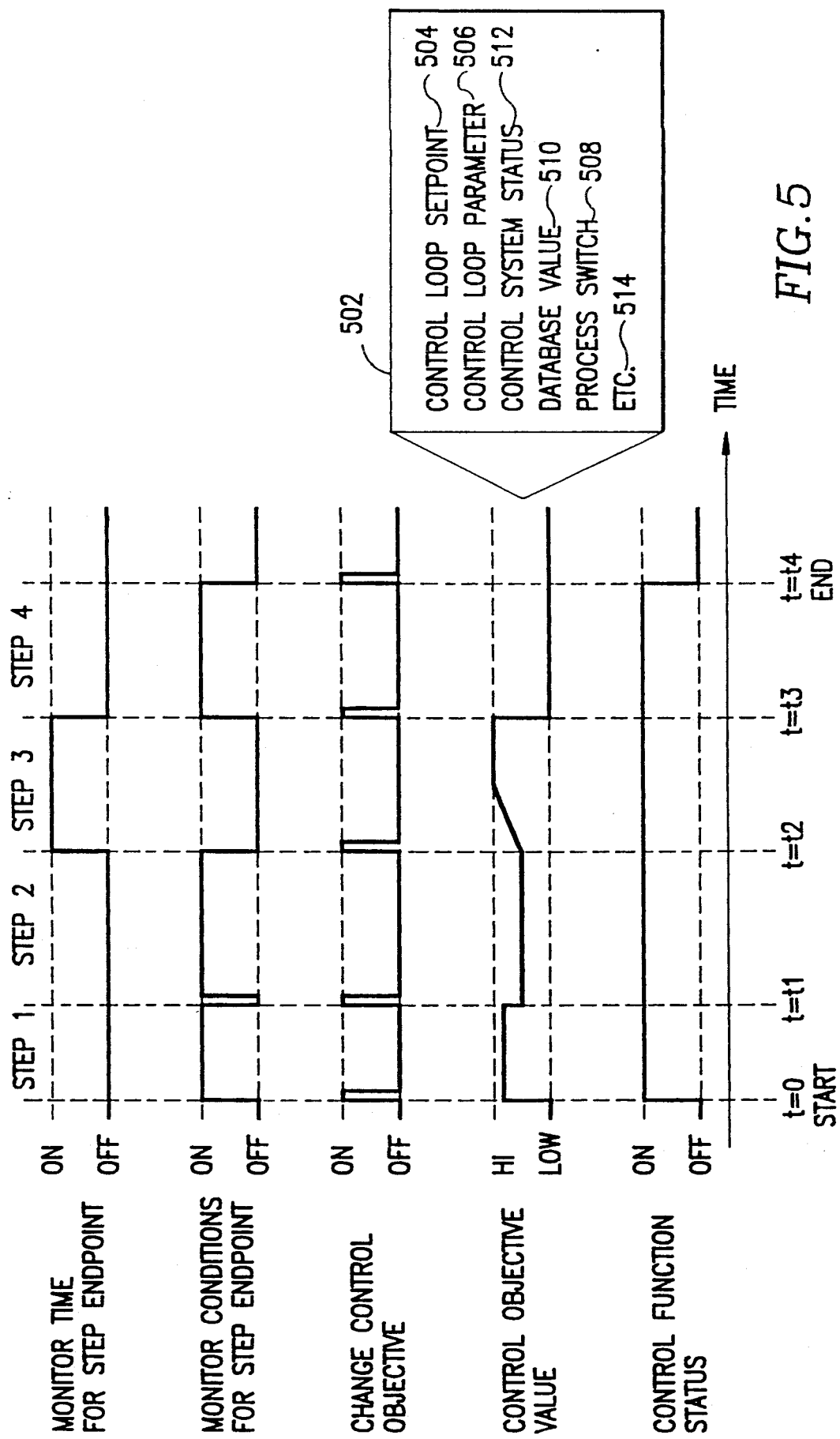
FIG. 5 shows the time history of the expert system based batch process control method of the present invention for a multi-step process including both time and expert system-based endpoint determination, with examples of what control objectives can be used, where the horizontal axis represents time.
Figure 6:
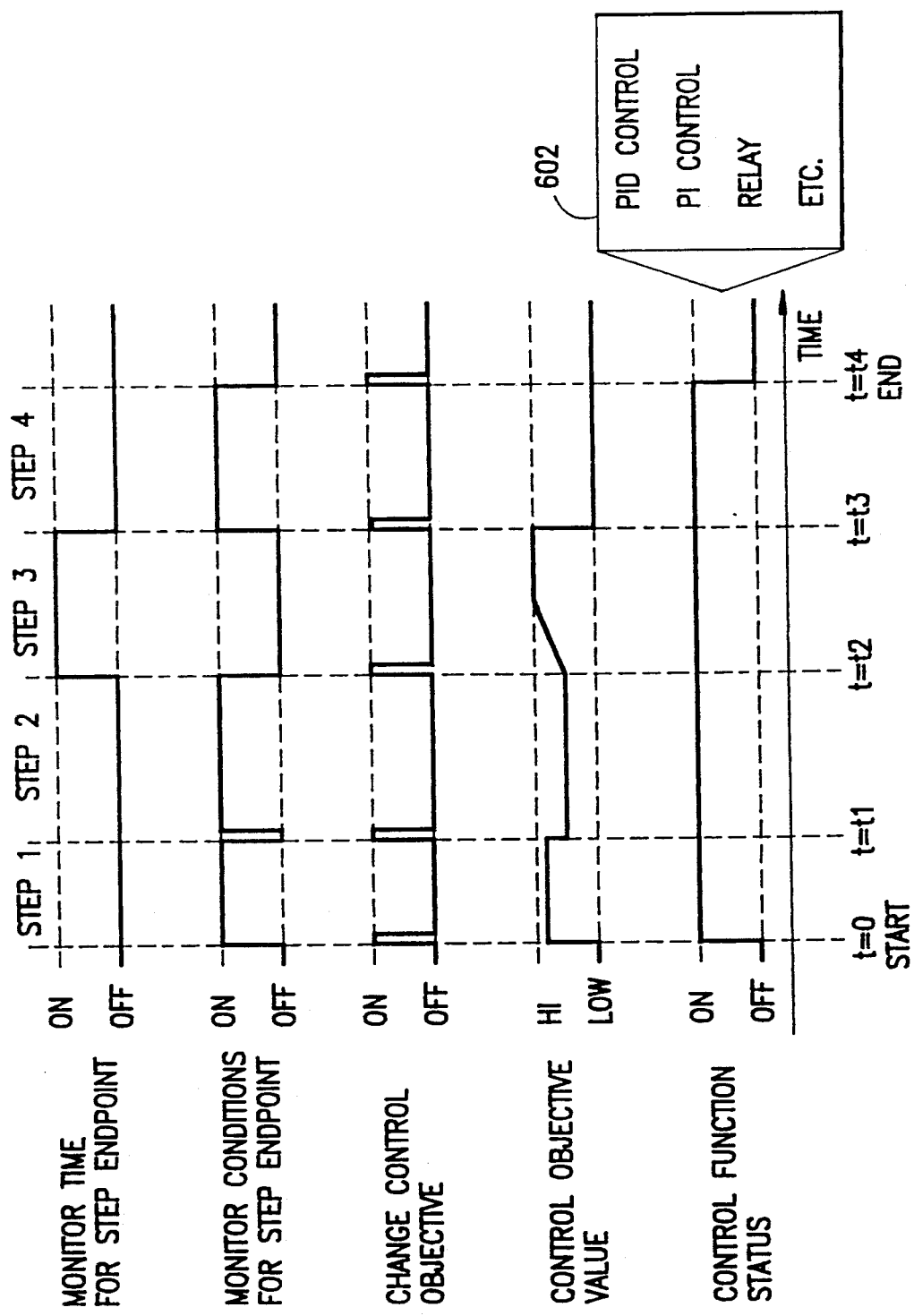
FIG. 6 shows the time history of the expert system based batch process control method of the present invention for a multi-step process including both time and expert system-based endpoint determination, with examples of what type of control functions might be used, where the horizontal axis represents time.
Figure 11:
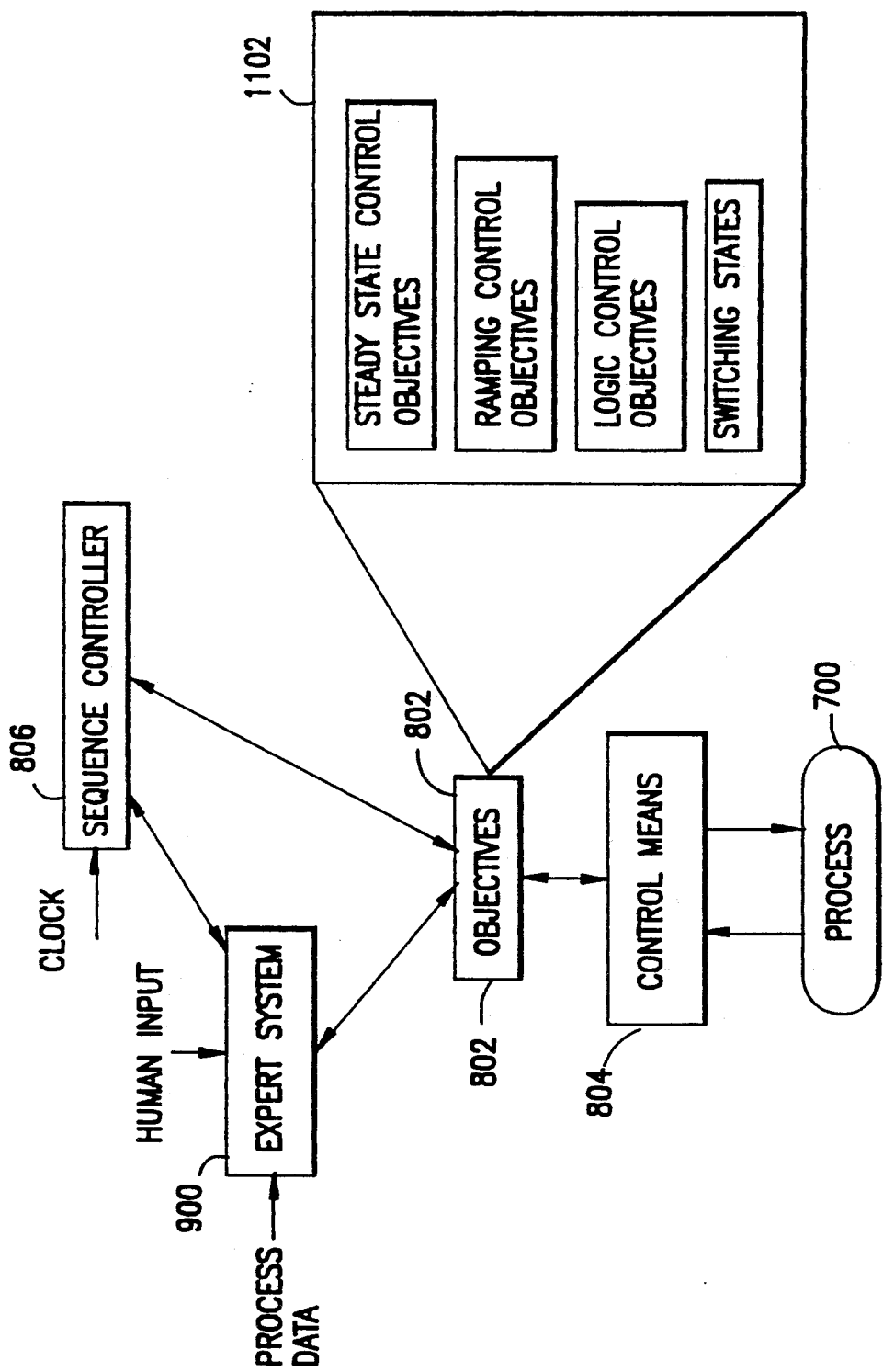
FIG. 11 shows a simple block diagram of the expert system based batch process control system of the present invention including a sequence controller, showing examples of the components of the control objectives.
Figure 12:
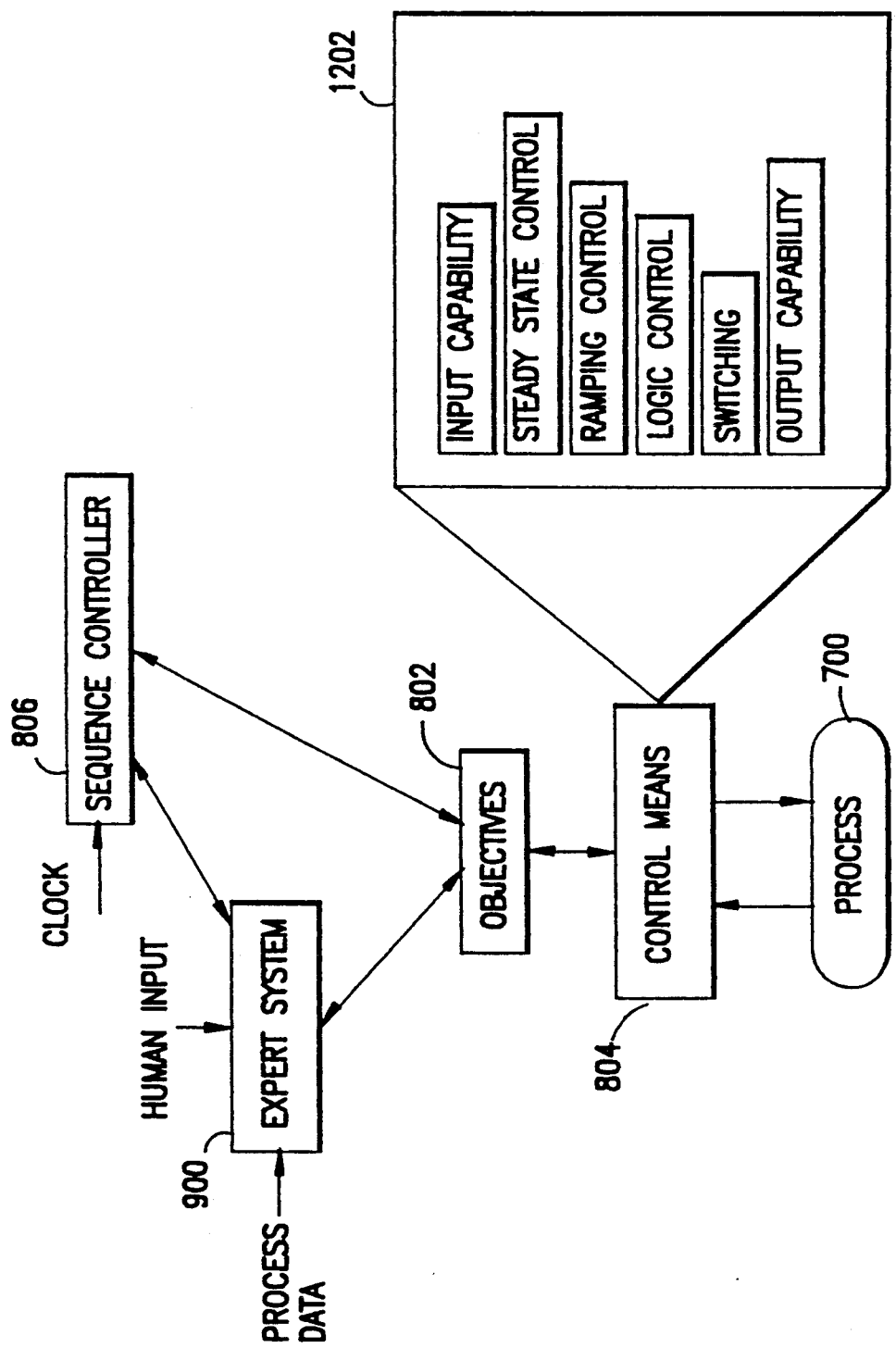
FIG. 12 shows a simple block diagram of the expert system based batch process control system of the present invention including a sequence controller, showing examples of the components of the control means.

Referring now to block 1102 of FIG. 11 and block 502 of FIG. 5, control objectives 802 of the batch process step(s) may include setpoints of feedback controllers or control loops 504, parameters used in feedback controllers (such as gain constants) 506, or they can be on/off status of switches 508, valves, controllers 512, etc., on/off inputs to logic controllers (indicated by 514), or a database value 510.

c. Expert System

As discussed above in the section describing the expert system based batch process control method, the knowledge base 904 of the expert system 900 allows the expression of process conditions that define a batch endpoint 702, and can process that knowledge to detect the endpoint condition.

d. Endpoint Condition

The endpoint condition describes the condition or conditions in the batch process 700 which, when present, indicates that the step of the batch process 700 is over. The condition must be expressed in the knowledge base 904 of the expert system 900 of the present invention. Endpoint conditions 702 might include logical combinations of, for example, limit values on current measurements, trend or slope values, time average values, statistical behavior of sample measurements, and so forth. They may also be based on information about the state of the process controller 804, like setpoint values 504.

3. Batch Control System with Expert Subprocedures

Figure 15:
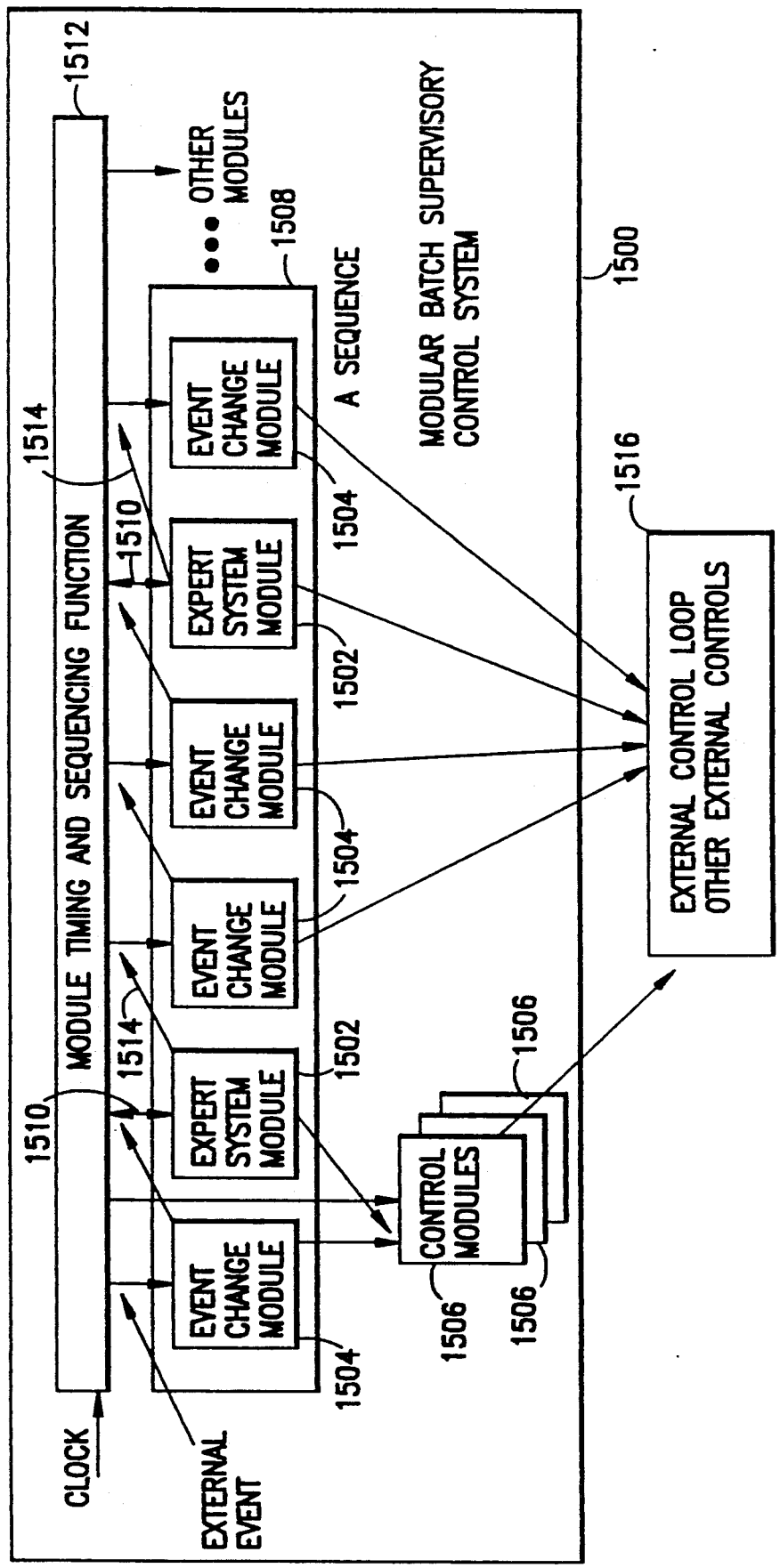
FIG. 15 shows an example of a sequence implemented in the modular supervisory sequence control system of the present invention, using other control modules.

Referring now to FIG. 15 showing the batch supervisory embodiment 1500, another aspect of the present invention is the integration of multiple expert systems 900 (shown as expert system modules 1502 in FIG. 15) into a batch process control system so as to constitute subprocedures.

The batch process control system supervises the execution of all the control functions 1502, 1504, 1506, including the expert systems 1502 it contains. The batch control system thus determines when each control function 1502, 1504, 1506 in a sequence 1508 or recipe should take place, as opposed to the batch control system determining when to perform its control functions independent of when the expert systems 1502 perform their expert system functions.

Putting expert systems 1502 as subprocedures in the control system makes it easy to turn on (as shown by links 1510) each expert system 1502 at the point in the batch sequence 1508 (or recipe) where its decision making functions are needed. This easily allows more than one expert system 1502 to be used in controlling the batch process 700, and makes it easier to coordinate the expert system functions with other control functions.

4. Modular Supervisory Sequence Control Method

Referring again to FIG. 15, another aspect of the present invention is a method of controlling a batch process 700 using expert system modules 1502 and event change modules 1504 (also referred to herein as event modules or fixed event blocks). First, (a) the batch process step is initiated by executing one or more event change modules 1504. Then, using a timing and sequence method or function 1512, an expert system module 1502 is (b) repeatedly run (for example, see block 302 of FIG. 3) to (c) test for an endpoint condition 702. When the expert system module 1502 detects the endpoint condition, the expert system module 1502 (d) disables further execution of itself and causes one or more event change modules 1504 to execute (see FIG. 15).

This aspect of the present invention is described in greater detail below:

a. Initiating the Step

Referring again to plot 102, if the batch process step is the first step in the process, it is probably manually initiated by a person (process operator) causing one or more event change modules 1504 to execute. If the batch process step is not the first step in the process, it typically would be initiated automatically when the previous step reached its endpoint. Thus, the present invention contemplates all presently known or future developed ways to initiate the step.

b. Repeatedly Running Expert System

An expert system module 1502 of the present invention implements an independent expert system as described above. One way that an expert system module 1502 can be run repeatedly is by using a timing function which executes the module 1502 at a fixed time interval 1910 so as to produce the cycling function.

c. Testing for an Endpoint Condition

Figure 13:
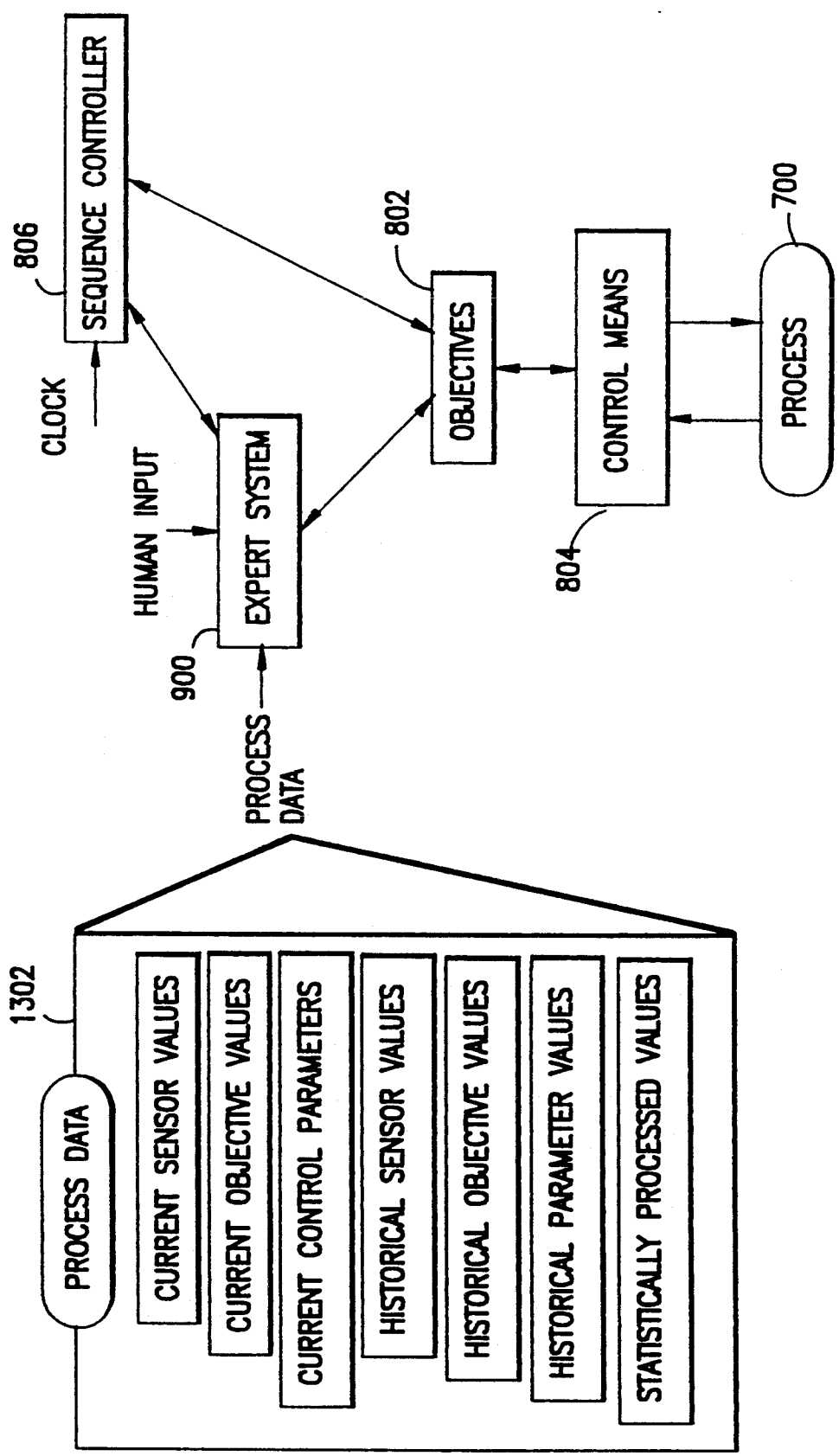
FIG. 13 shows a simple block diagram of the expert system based batch process control system of the present invention including a sequence controller, showing examples of the types of process data that can be used in the expert system.

When an expert system module 1502 of the present invention runs, it tests for an endpoint condition of the batch process step, which endpoint condition 702 is defined in its knowledge base 904. The expert system uses its inference engine 906 to process its knowledge base 904. It may retrieve, via its interface 902, 910, data (such as the examples shown in block 1302 of FIG. 13) referenced in its knowledge base 904, and performs any actions 706 in its knowledge base 904 that are indicated as a result of its processing.

d. Executing Event Modules

Once the expert system of the present invention detects the endpoint condition 702, it must initiate the next step in the batch process 700. This initiation is done by causing one or more event change modules 1504 to execute. These event change modules 1504 change the control objectives 802 (see block 502 of FIG. 5 for examples) to their proper values for the next step in the batch process 700.

The knowledge base 904 in the expert system can toggle on an event change module 1504, or it can send a request via link 1514 to execute to an event change module 1504. Once this is done, the expert system module 1502 has fulfilled its purpose for this step, and it no longer is needed in this recipe for the batch process 700. The knowledge base 904 in the expert system module 1502 can simply toggle off its own module via link 1510.

5. Modular Batch Supervisory Process Control System

Figure 14:
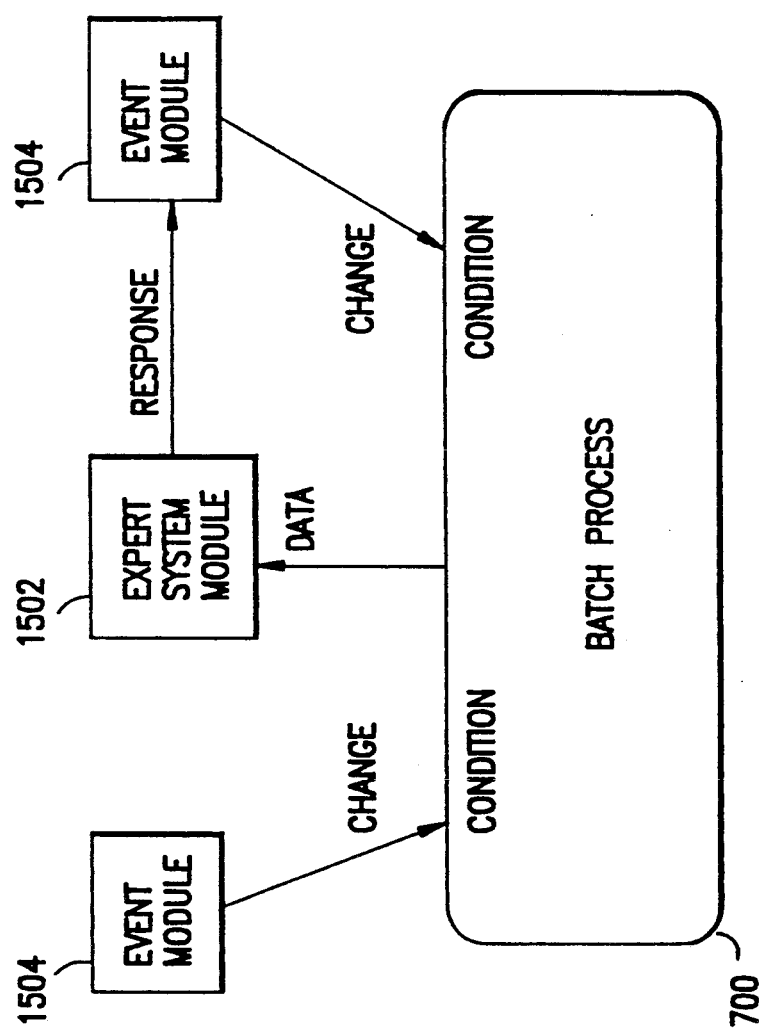
FIG. 14 shows a simple diagram of the modular supervisory sequence control system of the present invention.

Referring now to FIGS. 14 and 15, in a preferred embodiment of the present invention, the recipe for the batch process 700 is implemented in a modular batch supervisory process control system 1500 (called a "batch supervisor"), which provides a set of timing and sequencing functions (indicated by box 1512) which can control the execution of event modules 1504 and expert system modules 1502. The batch supervisor 1500 can also control other types of control modules 1506.

This embodiment is discussed in greater detail below.

a. Timing and Sequencing Functions

Timing and sequencing functions in accordance with the present invention are the highest level functions in the batch supervisor 1500 and provide a number of ways to specify when a module 1502, 1504, 1506 should execute. (Examples of possible timing and sequencing functions are listed in block 1902 of FIG. 19.) Each module 1502, 1504 or 1506 specifies which timing function it uses, and provides appropriate parameters for that timing function. Some timing functions (see 1906 and 1908 of FIG. 19) allow modules to be executed in sequence with specified time intervals between each module. Other timing functions may allow a module to execute repeatedly at a fixed time interval (see 1910), or to execute only when an explicit request to execute is received (see 1912).

b. Event Modules

Event modules 1504 of the present invention contain the definitions of the control objective (502, 1102) changes that need to be made at the start of each step of the batch process 700. As shown in block 1602 of FIG. 16, the most common changes are, for example, to set a setpoint to a value defined in the recipe (see 1604), or to set the state of a switch (see 1606), valve, etc. Setpoints can also be changed by incrementing their value by a fixed amount (see 1608). Sometimes a desired setpoint value might be stored somewhere, and the actual setpoint is changed to match the stored value (see 1610).

c. Expert System Modules

The expert system modules 1502 of the present invention contain knowledge bases 904 (see FIG. 17, which shows rulebase 1702 as an example) which test for endpoint conditions. Each expert system module 1502 usually has its own knowledge base 904. The knowledge base 904 may be completely independent, or it may be a subset (which is identified in some way) of a larger knowledge base. The expression of the knowledge can be in any suitable form, but is usually in rules (see 1702 of FIG. 17), or object/rule combinations. Expert system modules 1502 include the capability to send a request to execute to another module (see line 1704 of FIG. 17 for an example).

6. Modular Expert System with Multiple Instances

Some processes (both batch and nominally continuous) use many identical (or nearly identical) equipment units or machines in parallel. Generally, a common stream of feed material is split, and part is fed into each parallel unit. The product from the parallel units might be recombined and fed to further processing units or stored for sale. Examples include chemical reactors built in parallel because of size limitations on the reactors, and fiber spun from molten polymer on many spinning machines run in parallel.

When expert systems are used to monitor or control parallel units, the knowledge usually is the same for each unit. For example, if a rule knowledge representation is used, the same rules would generally apply to all of the units. Only specific data is different for each unit—the measurements for each unit will have different data specifiers, and, for example, a newer unit might be able to tolerate slightly higher temperatures than a older unit.

It is much more efficient to build and maintain a single rulebase for parallel units, and then customize the specific data for each unit. This could be achieved by using an object knowledge representation within a single expert system module 1502, but the modularity of the application would be reduced. It would be impossible to use the batch supervisor timing functions 1512 to coordinate the expert system analysis of individual units, since the knowledge for all the units would reside in one module expert system 1502.

An expert system module 1502 of the present invention which allows multiple instances (data) 1502 provides a single knowledge base 904 for multiple process units, while still preserving the modularity in controlling expert system analysis. It also allows simple rule representation to be used in place of a more complex object representation.

In expert system modules 1502 of the present invention having multiple instances data, the knowledge base 904 is common to a set of more than one expert system module 1502. A change made to knowledge for any module 1502 in the set changes the knowledge in all the modules 1502 in the set. However, each module 1502 can specify unique data to customize the knowledge. For example, the specifiers for the data to be used in the knowledge would probably be different for each module 1502 in the set. And numeric values, such as temperature limits, can be the same or different for each module 1502.

II. DETAILED DESCRIPTION

1. Batch Processes

As stated above, a batch process 700 is a way of producing a product using a procedure or a recipe which is carried out or run over time. Cooking is a classic batch process, in which a series of steps are followed through time to produce an end result.

One use of batch processing is what is designated herein as a "true" batch process. Such true batch processes are designed to work purely in time. In order to make something using a true batch process, you start with a given amount of the starting material. Later, when the process is complete, you have a related amount of end product. If you want more product, you have to make another batch.

True batch processes are used to manufacture commercial quantities of materials. For example, true batch processes are used to manufacture many chemicals, pharmaceuticals, pesticides, plastics and the like.

Batch processes can also be used by individuals for making small qualities of products. For example, cooking is that kind of true batch process. The sequence steps that can be programmed into some microwave ovens is a batch process.

Another kind of batch processing is a way of dealing with imperfect ("nominally") continuous processes. A continuous process is like a car wash, where dirty cars continuously go in one end and come out clean at the other end. A car wash might not work well enough to run like this forever. The brushes might wear out, for example. In this case, the car wash has to be stopped, the old brushes removed, new ones put in, and then the wash restarted.

Similar situations occur in continuous chemical processes, where, for example, a catalyst might deteriorate over time. At some point, the catalyst must be either be replaced or regenerated to keep the process operating properly.

These kinds of continuous processes usually go through a cycle, where they run in a continuous mode for a while, then they go through a replenishment sequence (for example, to regenerate catalyst), and then return to continuous mode. This kind of technique is used in refining crude oil, and may be needed in any continuous process when the equipment or the process performance deteriorates with time.

A third kind of batch processing is used for starting up and shutting down continuous processes. In general, a continuous manufacturing process cannot be started up by simply switching it on. Continuous processes usually require fairly complex conditions to be established before they can be started up and run properly.

An example of this start up problem in a continuous chemical process is a distillation column. For example, consider a continuously operating trayed distillation column which has an inventory of boiling liquid in its base and on each tray in the column. It also has a continuous flow of vapor boiling up from each tray to the one above, and a continuous flow of liquid from the top, and from each tray to the one below. The column most likely is hot when it operates.

To start up a column such as this one, the base must be filled with cold liquid. This cold liquid must then be heated to its boiling point, but the heating must be slow enough so that the column is not thermally stressed. As the liquid begins to boil, the vapor moves up the column, and the liquid in the base must be replenished. Eventually the vapor exits from the top of the column, is condensed and is returned as the liquid reflux to the top of the column. At this point the column is on total reflux, and is ready to have feed introduced and product removed so as to put it in continuous production. It thus can be appreciated that this kind of start-up process can be very complex.

In essence, all nominally continuous processes include some batch processing. Consequently the present invention as described herein can be applied very widely and in many applications. The inventor believes that a batch process has some unique characteristics, which include:

First, the process occurs over time. It starts at some point in time, and later the process is finished.

Second, the process is defined by a series of steps. Each step performs some different task in producing the end result. Each step requires different process conditions. Each step includes a definition of when it is over. The simplest batch process has only one step, but most have many steps.

Third, the steps in the process take place in a specific order. The ordered collection of the step definitions makes what we call a sequence or a recipe. As used in this application, the two terms are intended to mean the same thing.

Fourth, although unusual in continuous processes, batch processes often include requirements to change things that have only two states, like flipping a switch. This kind of on/off control is sometimes called digital control, or logic control.

It should be understood that chemical manufacturing processes are the primary focus of the present invention as of the filing date. This is evident in the specific embodiment and the specific implementation options of the present invention that are described.

However, it should be understood that batch process are used for many manufacturing processes. For example, the cooking process in a programmable microwave oven is a batch process. The present invention described herein is applicable for all types of batch processes.

Batch processes are used to make many valuable products, including pharmaceuticals and pesticides. Also, some very important nominally continuous processes, including the refining of crude oil, use a repetitive cycle of steps similar to a batch process. All nominally continuous processes use a sequence of steps to start the process up and to shut it down. So batch processes and batch processing play a very important role in manufacturing.

2. Control Means

A batch process recipe or sequence specifies conditions that are needed for each step. To use the batch process 700, those conditions have to be maintained in the process. In practice, the best one can do is to try to achieve the conditions. The inventor uses control means 804 to accomplish this goal. Most controllers 804 are standard and well-known, but more innovative or complex controllers could also be used with the present invention.

The most common control task in a batch process 700 is regulatory control, which maintains temperatures, pressures, motor speeds, and so on to try to match the desired conditions. These kinds of conditions are analog, meaning they can take on a continuous range of values.

Controlling analog conditions requires a means of measuring the condition. Sensors, which sense a condition and generate a signal (sent via link 704) representing the value of the condition, and actuators, which can change a process condition in response to a signal provide a link 700 between the controller 804 and the process 700. The job of the controller 804, in general, is to use the sensor data to determine how to adjust the actuator to best meet the desired condition 802.

Feedback control tries to maintain a process condition to match a setpoint or goal value 802. Since batch process recipes usually specify the conditions for each step, feedback control is an important control function in batch processes 700. Feedback controllers generally implement an algorithm that defines what the process state should be, or how the process state should be changed, as a function of the setpoint value and the current and past measured values of the condition.

A wide range of algorithms can be used. The most common and serviceable are the proportional, integral, derivative (PID), and the proportion, integral (PI) algorithms. For some kinds of batch process problems, simpler algorithms, such as proportional only (P), integral only (I), or on-off control work better. Sometimes a complex dynamic algorithm like internal model control, or even adaptive control, can be useful. All control algorithms depend on parameters to quantify or modify their actions. Proportional, integral, and derivative constants are typical parameters. Also, controllers 804 may have limits on how they can change their output.

Feedback control can also try to follow a moving goal. This is sometimes needed in batch processes 700 where the condition cannot be changed too quickly. To heat up a large vessel, the temperature might be ramped at a given rate so that the vessel is not thermally stressed. Specialized feedback controllers can do this.

Feedforward control can be used to head off problems in controlling a condition in a batch process. For example, if we are heating a stream of cold liquid, we know that as the temperature of the feed stream drops, we need to add more heat. We can adjust the heat input as soon as the feed stream temperature start to drop. If we really know enough about how the process behaves, we can keep the condition right where want it.

Feedforward control does not have a goal or setpoint. It uses some kind of a model of the process that indicates how much of change should be made in the process 700 to compensate for something else that is changing in the process 700. Feedforward control often uses a model which makes a change proportional to the measured change, but of course any appropriate model will give a good result.

The control as described above is single-input (sensor), single-output (actuator). This is the most common kind of control. However, there are more complex control methods, such as those that use multiple inputs and multiple outputs together. Such control methods are needed when controlling one condition which can adversely affect control of some other condition, and can also be used with the present invention.

Also, controls can be cascaded or operated in a supervisory mode, where one controller 804 changes the setpoint 802 (usually) of another controller 804 rather than changing the process 700 directly. All of the regulatory control methods described above can be used as supervisory control methods in the present invention.

In some situations, it is useful to have a very sophisticated controller. The modular supervisory control system described in the associated patent applications listed above could serve as control means 804 for allowing for statistical or expert system based control to be used.

The other kind of control used in batch processes 700 operates on-off (binary) actuators. The most important ones are electrical switches and on/off valves. On/off states of controllers or software control functions are also important in certain applications. Logic control defines relationships between on-off input signals and on-off outputs.

Batch process recipes often require things to be turned on or off. A logic control system in its simplest use could simply take an on/off indication for a process state and implement it via the appropriate actuator. A logic control system can also implement, for example, relay (or ladder) logic, which defines more complex logical relations between multiple inputs and multiple outputs. A batch recipe generally specifies on/off conditions which are inputs to a logic control system.

3. Control Objectives

The controllers 804 (or control means) of the present invention seek to maintain batch process conditions at desired values. Here, the desired values are what we call control objectives 804. Most control objectives 802 are setpoint values or on/off states of valves and devices. Some control objectives 802 might be more complex; for example, specifying the ramp rate and top of the ramp for a setpoint ramping task. Sometimes, a parameter like a controller gain might be an objective value.

Normally, control objectives 802 are maintained within the controller 804 that tries to meet the objective 802. However, the control objective(s) could be stored anywhere that the controller 804 and the sequence controller 806 (which is described below in detail) can both get access to it (them).

4. Expert Systems

Expert systems 900 as used in the present invention are computer programs which make decisions. In practical application, an expert system 900 is an integral part of a larger environment for developing and running expert systems. Because expert systems 900 are much easier to develop and maintain than conventional computer programs, they are valuable tools for automating decision making.

Expert systems differ from conventional computer programs as follows:

First, the decision-making knowledge in an expert system 900 is entered in relatively small, non-procedural pieces. The pieces often are simple "If-Then" rules, but more complex knowledge representation can be used. To enter knowledge, it is not necessary to know the order in which the pieces will be used, or if they will be used at all. This makes it easier for people configuring or operating the expert system 900 to know what to put into the knowledge base. Only a small aspect of the problem has to be entered at any time.

Second, the knowledge in an expert system 900 is usually expressed in a way that is much closer to the way people normally talk. This makes it easier for people to put the knowledge in once they know what to put in. This higher level expression may bring along some standard type procedures for working with the knowledge. As an example, a rule that makes a reference to the weather being sunny implies that a question should be posed to a user on a terminal asking if the weather is sunny. When the expert system 900 is run, the inference engine 906 of the expert system 900 would recognize this and use its interface 902, 910 to request the data. A rule that references a process measurement may imply that a retrieval request should be made to a database or control system to get that value. The inference engine 906 and interfaces 902, 910 would also handle this kind of data input. As a result, less procedure about how to use the knowledge needs to be specified.

Because of the higher level expression and bite-sized knowledge entry, expert systems 900 of the present invention can be developed and modified quickly. This is a major advantage of the present invention over conventional computer programming.

a. Components of an Expert Systems Environment

An expert system environment provides a number of generic functions which are common to all expert systems built in that environment, which are as follows:

One is the definition of the knowledge representation. The inference engine 906 of the expert system 900 needs to have the knowledge stored in a way that it can understand. The knowledge representation defines how the knowledge can be expressed.

A knowledge entry function provides a way for people to put knowledge into a knowledge base 904. Sometimes this is a text editor, but it could more constrained. For example, in the associated applications listed above, a knowledge entry system and method is described that is template driven, which works with a highly structured knowledge representation. The present invention contemplates all presently known and future developed means of knowledge entry.

A compiler or translator transforms the knowledge from the form in which it is entered to some internal representation which can be used by the inference engine 906. This may take place before the expert system 900 runs, like a compiler. Or, the translation may take place at run time, like an interpreter, or both.

The inference engine 906 processes the knowledge base 904 to make decisions. The inference engine 906 selects which piece of knowledge in the knowledge base 904 to apply next, and decides when to ask for input data 902. It also decides what actions are indicated by the decisions it makes and carries them out (910).

The (user) interface 902 communicates with people or with other computer systems to get input data, and to send (output) decision results 910. For consultation expert systems, this is often a terminal query and text display function. Where the input data used in the knowledge base is coming from computer measurements, the interface will preferably connect via link 918 to the process measurement database or control system. The interface preferably is also able to send requests back to a control system via link 914 or 916 to make changes in the batch process 700.

In general, every expert system 900 has a unique knowledge base 904. The knowledge base 904 expresses the decision-making knowledge about the domain. Most expert systems 900 use rules to represent knowledge. Some expert systems group rules around classes of objects, or use frames. For the purposes of the present invention, any form of knowledge representation can be used by the expert system 900.

b. Batch Control Needs

The role of expert systems 900 in the present invention is to identify the endpoint(s) in a batch process step(s). Two parts of the expert system environment must be especially adapted for use in process control.

First, the knowledge representation must be able to express the endpoint condition. In general, the knowledge representation needs to handle the temporal (or time based) behavior of measured values, and preferably allows some statistical processing of the data (over time). Also, the representation needs to allow decisions made by the expert system to cause control actions or communicate with people.

Second, the interface portion of the environment needs to have access to data from the batch process (and possibly the control systems) which is used in the endpoint knowledge. The data could be provided by people (process operator), but for automatic control, it is desirable to get the data directly from a computer source. It should be noted that the knowledge representation and interface functions described in the associated applications listed above is one good way of providing these functions. The interface must also be able to send commands to a control system to implement its decisions.

c. Expert System Modules

Referring again to FIGS. 15 and 17, expert system modules 502 of the present invention contain knowledge base(s) 904 which test for endpoint condition(s). Each module 502 typically has its own knowledge base 904. The knowledge base 904 may be completely independent, or it may be a subset, which is identified in some way, of a larger knowledge base 904. The expression of the knowledge can be in any suitable form, but it is usually in rules, or object/rule combinations. Expert system modules 1502 of the present invention can include the capability to send a request via link 1514 to execute to another module.

5. Sequence Controller

A sequence controller 806 provides a means of defining and implementing automatically some parts of a sequence (recipe) of a batch process 700. The sequence controller 806 stores the changes to be made automatically at the start of each step, and provides some logic control which implements the changes. Often the logic of the present invention uses time endpoint definitions, or is based on logical combinations of on/off measurements.

Programmable logic controllers (PLCs) with analog control loop capability are one way of implementing sequence control. Generally, they define the sequence using software analogs of drum timers or by building basic ladder logic functions. They are easy for many plant instrument and control engineers to use, but their functionality is limited.

Distributed batch control systems or general purpose computers running software for batch process control provide more flexible sequence specification at the expense of more complexity. The steps in the sequence are sometimes specified in a general-purpose, high-level language like Fortran, but often the system provides a special purpose batch control language. The sequence is expressed by the developer as a series of commands.

The languages generally provide commands that interface with on/off and analog inputs, outputs and parameters; that perform arithmetic; that communicate with operators; and that suspend the flow of the sequence based on time or ladder type logic specifications. The values of control objective or control parameter changes that need to be made during the sequence are expressed in the commands. The commands are then either compiled or interpreted to execute the sequence.

If the sequence controller 806 runs on a general purpose computer system, it may allow the sequence to call out to a subroutine written in a standard computer language like Fortran. This could be used to implement a complex endpoint determination. This has the usual disadvantages of programming in procedural languages for automation: difficult programming of time dependence; long development times; difficult maintenance; and it is very difficult to implement complex logic.

Some distributed batch control systems chain sequences in a linked list. Each item in the list is a sequence with all the time and logic control internal to that list item. This is different from the modular batch supervisor 1500 of the present invention as described below, because in the batch supervisor 1500, the linked list contains step endpoint changes, and the time control is handled by the supervisor, and complex logic control is provided by expert system modules 1502.

III. MODULAR BATCH SUPERVISOR

A modular batch supervisory process control system (which is referred to herein as a batch supervisor) 1500 is the preferred way to implement the present invention. When these techniques of the present invention are applied to automate a sequence, the collection of functions for that sequence is called an application. The person who builds the application is called the application developer. Applications are built in the batch supervisor 1500 of the present invention by combining general function pieces called modules 1502, 1504, 1506, 1508. A simple application using the present invention would typically include several event change modules 1504 and at least one expert system module 1502.

The batch supervisor 1500 is a supervisory control system. The batch supervisor 1500, in general, is not connected directly to process sensors or actuators. Lower level regulatory control systems 1516 provide the direct process connections, and also provide regulatory control. Regulatory control maintains basic process conditions such as temperature(s), pressure(s), and flow rate(s) to match objectives 802, and to control the on/off states of valves, switches, etc. While the batch supervisor 1500 defines the objectives 802, the regulatory control system(s) 1516 seek to attain them.

The key component of the batch supervisor 1500 is a real-time control program which carries out the module functions, including any expert system 1502 functions. It is preferred to use a build-supervisor program to set-up the basic control functions, and a build-expert program to simplify the building of expert systems. A shared memory area for storing setup information makes it easier for the build programs to work with the real-time control program. A procedure library is used to collect custom procedures and expert systems.

1. Modules

The batch supervisor 1500 is modular because its control functions are implemented in basic units called modules. Modules can be generic, which means they implement a general control function, which is customized for each implementation. Batch step changes, statistical tests, etc., are examples of generic module functions.

Modules can also be custom, which means their function is unique. Expert system modules 1502 and user-written program modules are custom module types. The application developer completely specifies the function that a custom module will perform.

To build a module, its function must be defined and stored where the real-time control program can access it. The developer can use the build-supervisor program to do this.

To create a module, a module function is selected from the set of functions provided by the batch supervisor 1500. This allocates storage area appropriate for that module type, and stores there a pointer to the procedure for that module function. The module function determines what additional specifications are needed to carry out that function. The build-supervisor allows the developer to specify this information, which is stored in the storage area allocated for that module. Finally, regardless of its function type, every module needs specifications that determine when it should execute its function.

a. Generic Modules

Figure 18:
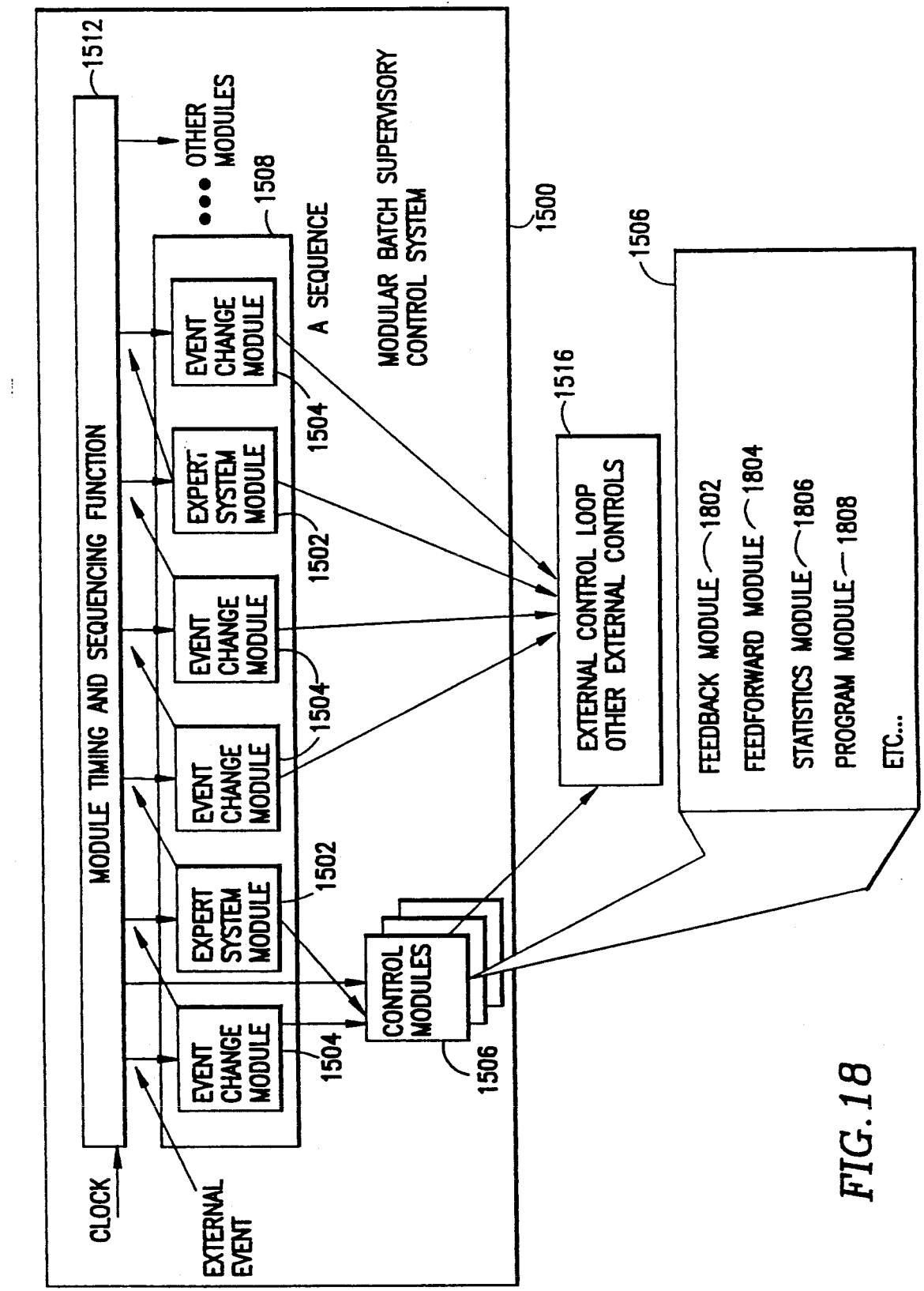
FIG. 18 shows an example of a sequence implemented in the modular supervisory sequence control system of the present invention, using other control modules, showing examples of the types of other control modules that could be used.

Generic modules carry out standard functions selected from a set provided by the real-time control program. In the current implementation of the present invention as shown in FIG. 18, the generic module types are, for example, event change 1504, feedback control 1802, feedforward control 1804, Shewhart statistical test 1806, and Cusum (cumulative summation) statistical tests 1806.

Each standard module function requires parameters which customize the action of the function for that module. For example, a event change module 1504 might specify that a specific setpoint in a specific control system should be set to a specific value. The procedure by which the setpoint is changed is standard, while the pointer to the specific setpoint and the value to be sent are the parameters which customize the procedure. A generic module is thus only a pointer to a generic function, plus the parameters needed for that function type, plus timing specifiers.

b. Custom Modules

Some control applications require functions which are too complex to be solved with small, generic, modular functions. Detecting a complex endpoint condition in a batch process 700 is one such function.

To address these needs, the batch supervisor 1500 provides two ways of integrating customized functions into the overall supervisor system.

First, the developer can write his own program in a language like Fortran, and implement that computer code as a custom user program module 1802 as shown in FIG. 18. Second, the developer can create an expert system which carries out his function and implement that as an expert system module 1502.

User program modules are best for complex computations or highly procedural tasks, and also work well for formatting output data. Expert system modules 1502 are best for logical or decision making tasks.

To build a custom module 1502, 1808, the developer has to develop the entire procedure that the module will carry out. (Procedure as used herein means a general task in the control system. An expert system is a procedure in this sense, even though expert systems in concept are not procedural.)

This procedure must be available to the real-time control program, and the module data must contain a pointer to it. Custom modules 1502, 1808, like all modules, need parameters that specify when they are to execute their function. The pointer to the procedure timing function and the timing parameters are stored in the same way as for generic modules, but custom modules 1502, 1808 do not use parameters to customize their functions.

2. Event Module

An important module function for batch process control is called an event change module 1504. An event change module 1504 carries out a one-time event, which can be used to change conditions for a batch process step.

Figure 16:
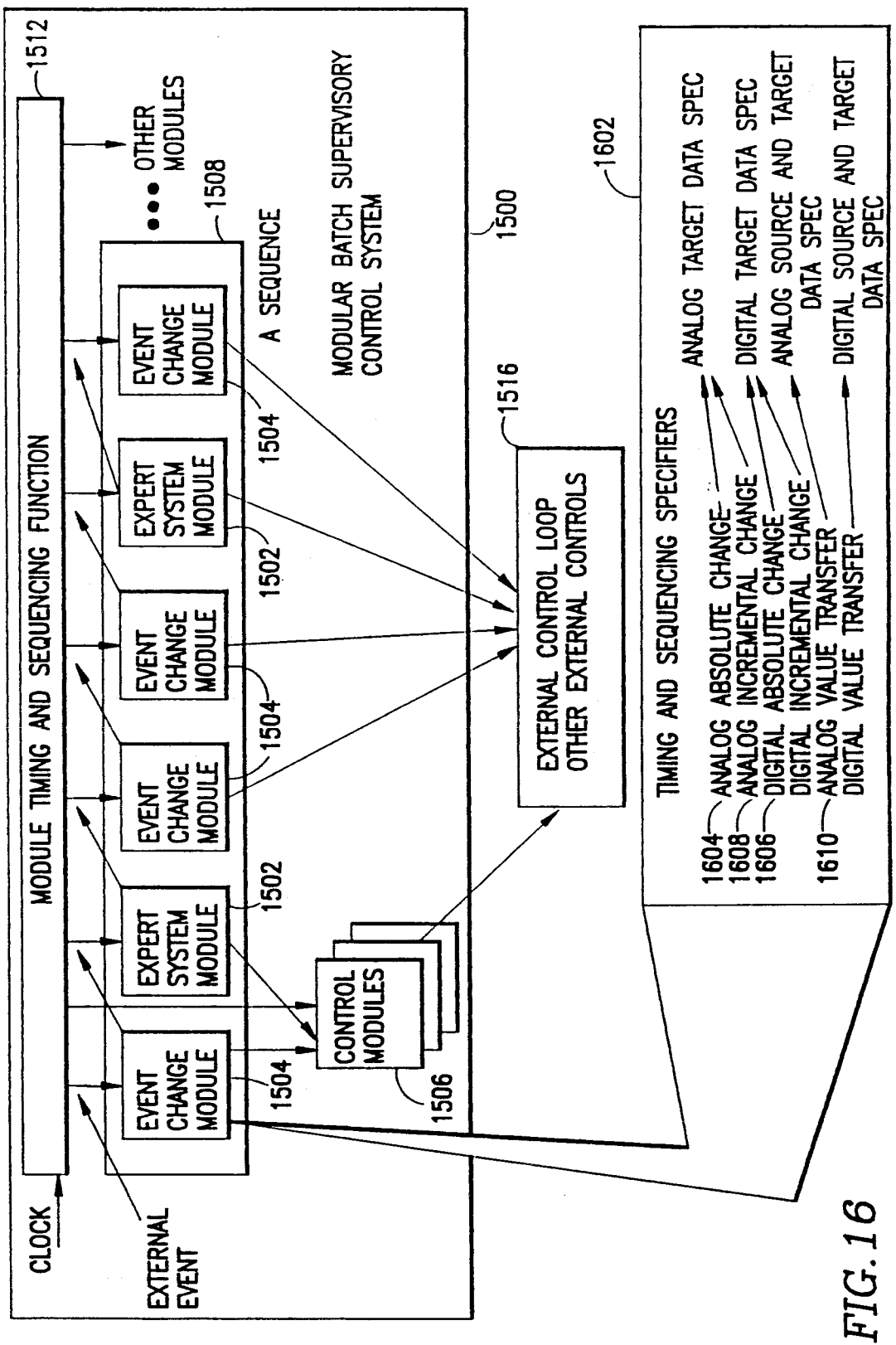
FIG. 16 shows an example of a sequence implemented in the modular supervisory sequence control system of the present invention, using other control modules, showing examples of the components of the event module specifications.

As shown in FIG. 16, an event change module 1504 allows analog or digital (on/off) target values to be changed. Target values for an event module can include setpoints of feedback controls, on/off states of controls, or on/off states of physical equipment like valves and motors. Changes can be absolute, where the target value is set to a pre-defined absolute value, or incremental, in which the target value is changed by a fixed amount. In the preferred embodiment, each event change module 1504 allows up to four such changes.

It should be noted, however, that event change modules 1504 in the present invention are not limited to this form. For example, limits could be allowed on the values that can be set by the changes. This would allow the developer to constrain the resulting value so that changes would not push the target value outside of a desired operating range. Also, a different maximum number of changes could be allowed for each event change module 1504. Also, other types of changes could be allowed, such as transferring a value from a stored location to the target.

3. Expert System Module

Expert system modules 1502 of the present invention implement expert systems (as described above) which make decisions based on process data. In the associated patent applications listed above, expert systems were called from user program modules. In the present invention, it is preferred to use a module dedicated to each expert system. It is believed that this is easier for developers to understand and use.

Unlike interactive, consultative expert systems, expert systems used in expert system modules 1502 of the present invention preferably obtain all their data directly from process data collection and control systems. For the present invention, the knowledge in an expert system module 1502 is built to test for an endpoint condition of a step of the batch process 700. The knowledge base 904 may be a subset of a larger knowledge base 904 which is identified in some way. The knowledge base in the preferred embodiment is expressed as rules, but it should be understood that the present invention contemplates all present and future developed knowledge representations.

For example, objects or frames could be used to group rules and data. These knowledge representations would allow the knowledge contained in an object or frame to be applied to more than one real world object. This is very useful when a batch process 700 includes more than one nearly identical equipment unit. An object representation would allow multiple instances to be created, so that the same knowledge can be customized to apply to many pieces of similar equipment. However, a better way to do this which preserves the modularity of the batch supervisor 1500 is to allow multiple instances of the whole rule base as separate expert system modules 1502, as described below.

4. Other Module Types

The batch supervisor 1500 of the present invention may be used to supervise not only regulatory control of, for example, temperatures, pressures, switches, etc., but it also can supervise continuous supervisory controls, like those described in the associated patent applications listed above. It is preferred to include the continuous supervisory control function in the batch supervisor of the present invention, since these functions can be implemented as modules in the supervisor. Continuous control functions can be used to maintain conditions during a step in a batch process.

For example, it might be desirable to maintain a product composition from a distillation column under statistical control during a step in the batch process 700. Or, for example, the "process" might be mainly continuous with sequence regeneration. In this case, the continuous controls would be used during the normal continuous operation, and the batch controls could be used for the sequence steps.

Referring again to FIG. 18, the module types that are used for this approach are feedback control 1802, feedforward control 1804, Shewhart statistical test modules 1806, and custom cumulative summation statistical (CUSUM) test modules 1806. The first three are described in the associated patent applications listed above. The CUSUM module 1806 performs very much like the Shewhart module 1806, but it uses a different algorithm.

The statistical test modules 1806 can be used to keep repeat batches in a batch process 700 under statistical control. The test would be applied to a measure of the product properties at the end of each batch. A shift identified by the statistical test means that a change needs to be made in the batch process 700 to move the property back to aim on subsequent batches. This means that the recipe of the batch process 700 must be changed.

The change in the recipe of the batch process 700 can be made by a feedback control module 1802. The feedback action could change a setpoint, like a temperature setpoint, in a step of the batch process 700 by changing the absolute value set by an event change module 1504. The feedback action might also change the time duration of a step in the batch process 700 by changing the execution time interval of a module in the sequence.

5. Real-Time Control Program

The real-time control program carries out the control functions. It is called real-time since its operation must be fast enough to respond to the batch process 700 changes and to the recipe for the batch process 700. Like most real-time programs, it is primarily non-interactive: it does not communicate with people directly while it operates. It does interact with the batch process 700 via control and data collection systems 1516. The real-time control program stores information about its past and current state in the shared memory area.

The real-time control program of the present invention implements a set of module timing and sequencing functions 1512 which control the execution of modules 1502, 1504, 1506. The real-time control program runs through a base cycle at a fixed base cycle interval. During each base cycle, the real-time control program scans all modules 1502, 1504, 1506 in the batch supervisor 1500. For each module, it checks the timing function and parameters, and the history of that module's execution to determine if it is time for that module to execute. If so, it executes the functions of that module. After all modules have been checked and executed (if needed), the real-time control program waits until the scheduled time of the next base cycle.

The base cycle interval of the real-time control program of the present invention determines the granularity of time for the control applications which it implements. The fastest process event handled by an application in the batch supervisor 1500 normally determines the base cycle interval.

The base cycle interval normally is short enough that the fastest process event can be responded to adequately in one base cycle. This means that on most of the base cycles, no modules will execute. However, a shorter base cycle interval is desirable since passage of time or occurrence of events in the batch process 700 can only be resolved to the frequency of the base cycle interval.

The base cycle could be run continuously without waiting between cycles. And since computer systems are able to simultaneously carry out multiple tasks, this would not preclude other useful work to be done on the computer. Such an approach may be desirable for batch processes 700 which are fast relative to the operation of the batch supervisor 1500.

a. Timing and Sequencing Functions

Timing and sequencing functions 1512 provide a number of ways (see block 1902 for example) to specify when a module 1502, 1504, 1506 should execute in accordance with the present invention. In essence, module timing is specified in the same way as module function.

Each module specifies a timing function from a set provided by the batch supervisor 1500, and provides appropriate parameters which customize that timing function. One common timing function is to execute a module repeatedly at a fixed time interval 1910. This function requires the execution time interval as its only parameter. Other timing functions with special batch usefulness allow modules to be executed in sequence with specified time intervals between modules 1906, 1908, or to be executed only when an explicit request to execute is received 1912.

Among the timing functions provided by the batch supervisor 1500 of the present invention is a set of batch timing functions 1906, 1908. These allow standard time sequence batch control with which a series of modules can be set up to execute in series with pre-defined time intervals between modules.

To illustrate this aspect of the present invention, consider a line of dominoes as an analogy. The module which starts the chain of dominoes falling uses the first domino timing function 1906, which uses one parameter: the execution time interval. Modules using this timing function execute their module function when the module is turned on. The module stays on for the specified execution time interval. Then, the module turns itself off. Note that the module can be turned on manually, using the build supervisor program. It can also be turned on by any program or expert system 900 running on the computer, which allows a user-written program or an expert system 900 to conditionally initiate a sequence of modules.

The following domino timing function 1908 is used for all the succeeding dominoes in the time sequence. This timing option uses two parameters: the pointer to the module that precedes it in the sequence, and an execution time interval. Modules using this timing function execute their module function when the specified preceding module turns off. The module stays on for the execution time interval, and then turns off (for one base cycle only).

The fixed interval timing function 1910 executes a module repeatedly at a fixed time interval until the module is turned off.

The program request timing function 1912 executes only when a request is made programmatically. These requests can be made from any program or expert system 900 running on the computer. The most common use of this timing function 1912 is to allow a user-written program module 1808 or an expert system module 1502 to conditionally initiate a module function or a sequence of modules.

The combination of these timing functions is important to the use of the present invention. In addition to providing basic time sequence control capability, these timing functions provide the framework which allows modular expert system logic to be inserted into a sequence to make endpoint determinations. The expert system module 1502 can then start the remainder of the sequence.

6. Shared Memory Area

Modules are defined by storing the information that defines their actions in a shared memory area. To create a module, storage space must be allocated for the module. The information, usually in the form of parameters which define what the module will do, is put into the storage area. Typical parameters are, for example, numbers, character data, or pointers in the form of a number. For each module function, a parameter map defines what is stored in the module storage area, and where each parameter is located in that area.

The shared memory area preferably should be non-volatile, so that its contents are preserved even if the computer system is shut down or fails. This non-volatile storage not only preserves the definitions of the module functions, but it also preserves the execution history of the real-time control program and of each module. In the preferred embodiment, this shared memory area is kept in fast memory, while still maintaining a disk copy of the shared memory area. The disk copy is loaded into memory when the batch supervisor 1500 is first started.

7. Build-Supervisor

The build-supervisor program of the present invention helps the developer enter module specification data. The build-supervisor also allocates module storage and ensures that module specifications are correct and complete before modules can be executed. The build supervisor can define the module function and the timing parameters for custom modules, but it relies on the build-expert and build-user-program functions to specify the procedures these modules execute.

In the preferred embodiment of the present invention, form (or template or "functional structure") entry for setting up modules in the build-supervisor is used. The inventor has found that forms allow a collection of information to be displayed in way that makes it easier for the developer to understand what has been entered and what still needs to be entered.

The general forms (functional structure) entry of module information is described in detail in the associated patent applications listed above. The present invention extends this approach with the addition of the event change module (see FIG. 20) 1504 and the expert system module 1502 (see FIG. 21). These modules use the methods for specifying input information shown in FIGS. 20 and 21.

As stated above, another advance of the present invention is the addition of an expert system module 1502. The expert system module setup form is shown in FIG. 21. It includes timing specifiers. The expert system module setup form also includes a key definition, which allows the developer to directly enter the build-expert program. The knowledge the developer enters is added to the knowledge base for that module 1502, and is automatically built into a runnable expert system 900 for use by that module 1502. The inventor has found that this simplifies the task of building expert systems and linking them to module timing functions.

8. Build-Expert

The build expert program of the present invention allows the developer to enter knowledge into a knowledge base 904, and to implement the knowledge base 904 as an expert system module 1502. The build-expert program was described in the associated patent applications listed above. In the present invention, it is preferred to use the three pre-defined rule structures entered through forms (functional structures). This is an easy paradigm for developers to understand, and it standardizes the representation of batch process knowledge.

9. Temporal Knowledge Representations

Some additional temporal (or time dependent) knowledge representations have been added to the build-expert. When an expert system is run repeatedly to monitor a batch process, it is important to be able to identify changes in the state of the batch process 700. For example, the batch process 700 may be running normally on one monitoring cycle, but is in an upset condition on the next cycle. If the expert system 900 can only identify the current state of the batch process 700, it can send a warning message or take a corrective action. However, since the expert system 900 is running repeatedly, it would repeat the message or action on every cycle. This means a corrective action might be repeated too many times, or a message issued repeatedly.

It is useful for the expert system 900 to be able to detect the one cycle in which the batch process state changed from normal to upset. It can then issue a message only on the cycle when that change of state is detected. If the batch process stays in an upset state for a long time, the expert system 900 would not send messages on subsequent cycles. The knowledge representation in the expert system 900 in accordance with the present invention has been enhanced to allow this to be done as described below.

a. Is/Was in Analysis Rules

A significant development in accordance with the present invention is the addition of the parameter is/was in the analysis rules. Referring now to FIG. 28, IS refers to the current state as determined by the rulebase. WAS refers to the state that was determined the last time the expert system module ran or was run.

These two is/was states are stored internally in the expert system module 1502. This location allows an analysis rule to compare the current state of the batch process 700 to the state the last time the expert system module 1502 ran.

A rule which detects a change in state can easily be built, and can be easily understood, by the developer.

b. Last Cycle Time

The last cycle time parameter is another significant development in accordance with the present invention. Referring now to FIG. 27, it allows reference to data corresponding to the time the expert system module 1502 last ran, which is called the last cycle time. The last cycle time can be used to refer to data in a historical database.

It should be understood the last cycle time does not require the rulebase developer to know how far in the past the last cycle time will be. Even if the module uses a timing option that causes the module to execute at irregular time intervals, the last cycle time will always correctly reference the last time the expert system module 1502 ran.

10. Build User Program

The build-user program function is described in the associated patent applications listed above. The build user program allows the developer to write his own computer code (currently Fortran is utilized, but it should be understood that any currently available or future developed compatible language could be used). It also allows the developer to incorporate this computer code either as a user program module 1808, or as a user routine which executes immediately after any of the other types of modules.

11. Procedure Library

Both the build expert program and build user program generate procedures. These procedures must be made available to the real-time control program so that they can be executed when the modules 1502, 1808 which point to them are executed. In the preferred embodiment, the build expert program and the build user program are implemented by generating and compiling computer code. A procedure library is used to hold a store all the compiled procedures.

The compiled computer code of the procedures generated by the build expert program or the build user program is integrated into the real-time control program by relinking the real-time control program.

12. An Example Application in the Batch Supervisor

The following example illustrates the use of the present invention. For simplicity, we show how only one control objective can be changed, using one expert system to detect a step endpoint. Commercial applications would normally involve many steps and many batch process control objectives. It should be noted that this embodiment does not constitute a best mode application of the present invention.

The batch process 700 in the example is a high temperature reactor to which both hydrogen and a liquid reactant are fed. Some hydrogen passes through without reacting and is recycled back to the feed. Some of the liquid feed is also recycled. The recipe for this process is:

Step 1 conditions: Reactor heater temperature setpoint 200 degrees.

Step 1 endpoint condition: Average reactor inlet temperature over 30 minutes greater than 195 degrees, and the ratio of recycle hydrogen to recycle liquid greater than 20.

Step 2 (end of recipe) conditions: Reactor heater setpoint set to 15 degrees. This effectively turns off the heater, since room temperature is about 18 degrees.

The reactor heater temperature in this example is controlled by an analog control loop in a programmable loop controller called a PM550 made by Texas Instruments of Dallas, Tex. Most of the measurements of the batch process 700 are collected in a historical database system called Vantage from E.I. DuPont of Wilmington, Del. The batch supervisor is called PACE from E.I. DuPont of Wilmington, Del. The PACE system used to implement this example application is connected to one Vantage system and seven PM550 controllers. In PACE, modules are called blocks. The two terms are interchangeable in this context.

FIG. 20 shows an event change module 1504, called a fixed event block in PACE, which is configured to set up conditions for step 1 of the example batch process 700. The block uses the first domino timing option 1906, which means it will execute its event when it is first turned on. The block has two events configured. The first event sets the setpoint of the reactor heater control loop to 200 degrees. The second event turns on PACE block 161.

FIG. 21 shows PACE block 161. This is an expert system block 1502 which monitors for the endpoint conditions in the example batch process recipe. This block uses the fixed interval timing option 1910 with an execution time interval of 2 minutes. Once turned on by block 160, this module will execute its expert system knowledge base 904 every 2 minutes until the block is turned off. The knowledge base 904 is described below.

FIG. 22 show event block 162 which sets conditions for the end of step 1 of the batch process 700. If another step followed in the recipe, this block would set up conditions for step 2. Since this example only has one recipe step, this block simply shuts the batch process 700 down. Block 162 uses the program request timing option 1912, which means it will only execute its events when explicitly requested by a program call. It has one event which changes the setpoint of the reactor heater control loop to 15 degrees.

This block, which is activated by the expert system block 1502 to continue the batch process, could also have used a first domino timing option 1906. This would be appropriate if other steps followed step 1 and the recipe contained a time endpoint definition for step 2. Also, block 162 could include an event to turn off the expert system block 161. In this case, the rulebase in block 161 would not need to contain a rule to turn off block 161. The result is equivalent, so the choice is arbitrary.

FIGS. 23 and 24 show the help screens from which the developer can select control objective types to change using the event block. The available options are specific to control and database systems available at this batch supervisor installation.

FIGS. 25 through 30 show the knowledge base 904 used to detect the endpoint and trigger the change to the next step. The knowledge in this rulebase is based on the three rule types and use predefined rule structures provided as templates.

Figure 26:
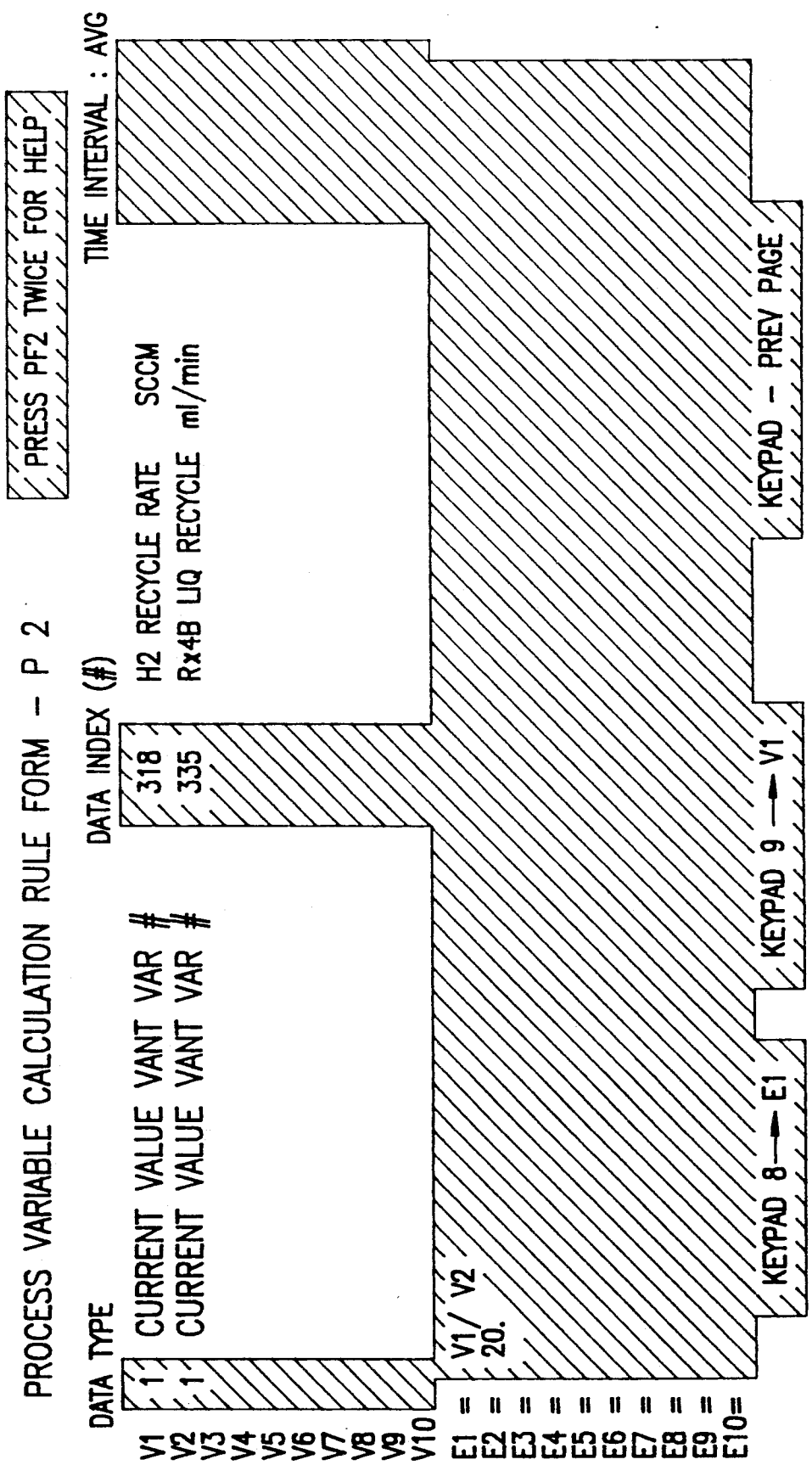

FIGS. 25 and 26 show a calculation rule which classifies the current value of the ratio of hydrogen (H2) recycle flow in standard cubic centimeters per minute (sccm) to the liquid recycle rate in milliliters per minute (ml/min). The ratio is HIGH ENOUGH if it is greater than 20, otherwise it is STILL LOW.

FIG. 27 shows a variable rule which classifies the 30 minute time weighed average of reactor inlet temperature. It is OK FOR 30 MINUTES if the value is greater than 195, otherwise it is NOT READY YET.

FIG. 28 shows an analysis rule which checks for step 1 endpoint conditions. If AVERAGE REACTOR TEMP (as defined by the variable rule) is OK FOR 30 MINUTES and REACTOR RECYCLE RATIO (as defined by the calculation rule) is HIGH ENOUGH, then STEP 1 is defined be AT ITS ENDPOINT.

FIGS. 29 and 30 show action rules which cause block 162 to execute and turn block 161 off. Block 161 is the block to which this rulebase belongs, so this stops this expert system 900 from further endpoint monitoring. In FIG. 29, a call to a PACE utility function TOGGLE-BLOCK is used. In FIG. 30, another PACE utility function is used which causes blocks to execute which have the program request timing option. This action causes block 162 to execute its event, thus ending step one (and for this example, the recipe).

The application operates through the following sequence. Event block 160 is turned on by a person using the block toggle on/off functions in the build supervisor (shown as keypad 7 in FIG. 20). This sets the reactor heater setpoint to 200 and turns on expert system block 161. Since event block 160 uses the first domino timing function 1906, it will turn itself off and will not execute until turned on again.

Expert system block 161, when turned on, runs every two minutes until its rulebase detects the endpoint conditions. This will cause the action rules in the rulebase to turn expert system block 161 off and cause event block 162 to execute. When event block 162 executes, it sets the reactor heater setpoint to a low value, effectively turning the heater off and ending the process. Since it executes on program request only, it will not execute again until requested by the expert system block. The recipe is now finished, and all the blocks are ready to repeat the recipe.

Commercial use of the batch supervisor 1500 typically requires much more complex applications. However, this example illustrates the basic functions of the batch supervisor needed to practice the invention.

IV. SOFTWARE TECHNIQUES FOR IMPLEMENTING THE BATCH SUPERVISOR

The batch supervisor 1500 can be implemented as follows. The methods described in this section are the preferred way to implement the present invention, but other software development techniques could be used to achieve the same result. In the following discussion, we use the term block to mean the same thing as a module.

The techniques described below apply to VAX computers using the VMS operating system from Digital Equipment Corporation of Maynard, Mass. Almost all of the batch supervisor is coded in Fortran computer language.

1. Shared Memory Area

The shared memory area (SMA) is the foundation on which the batch supervisor 1500 rests. For best utility and robustness, the SMA should be accessible by many independent programs, called processes, running on the computer. The SMA should also be non-volatile so that its contents are preserved through all types of computer outages and failures. For most flexibility, the SMA should be dynamically sized. This is difficult in Fortran, and the memory requirements are small, so we prefer to use a fixed size SMA.

The global section feature of VMS is used, since it forms a sharable memory area with a shadow copy on disk. The global section is created in Fortran by declaring storage for the SMA in one or more Fortran named common blocks in a block data subprogram. We prefer to use arrays for real, integer and character data sized for the number of blocks supported.

The block data subprogram is compiled and then linked using the share parameter of the link utility to form a shareable image of the common block on disk. To map the disk copy into memory and make it accessible to many processes, the shareable image file must be installed using the share, open, and write options in the install utility.

2. Contents of the Shared Memory Area

The SMA is used to store data about the batch supervisor 1500 and about its blocks. It includes batch supervisor constants like the base cycle time, and dynamically updated status information, like the status of the system, the time the next cycle is scheduled, etc. For each block, the SMA includes the parameters that define the block action, and dynamically updated status information such as the block status, last execution time, a record of the most recent actions, etc.

3. Shared Memory Services

We prefer to get and put data into the SMA using a comprehensive set of service subprograms which can be called by any application program which needs access to data in the SMA.

The services are Fortran subroutines which accept requests to get or put information from the SMA. The services test all requests to be sure they provide valid information. They also issue appropriate error and warning messages when incorrect get or put requests are made. The services contain code which defines what SMA requests are legal. Some services contain only definitions of what data references are legal on the current installation of the supervisor. If the service routine accepts a request, then data is entered into or read from the SMA.

The services gain access to the SMA by declaring the same named common blocks in the source code. Programs using the services are linked against the SMA shared image file using the share option.

4. Retrieval Services

We prefer to make all access to input and output data using a set of data retrieval services. Any calls to get or put data in external-control systems, databases, etc., are placed in this collection of routines. The shared memory services also use these routines to test references to external systems, like control loop numbers, to ensure they are valid.

5. Shared Service Image

We prefer to link the SMA services and retrieval services together in an overall service shareable image. This shareable image is not executable by itself, since it contains no main entry point. However, the image can be linked into other main programs. This makes the services available to the programs without relinking all the computer code in the service shareable image. The service shareable image can also be installed using the install utility. This adds efficiency when multiple programs run simultaneously using the image. When installed, the image is kept in memory at all times, and the same copy of the image can be executed by more than one program. Programs that use the image need not copy the image from disk when they are started, and memory is not consumed keeping multiple copies in memory.

6. Site Specific External System Support

The general data specification used in the batch supervisor 1500 and its supporting build programs allows flexibility in communicating with many external sources of data. However, each installation of the batch supervisor 1500 preferrably should restrict the data requests to those external systems which are accessible to that installation. For example, an installation on a site with no historical database must not allow developers to make module specifications that point to data in a historical database.

We prefer to establish the definitions of the supported systems at an installation using the logical name capability. Logical names are essentially variables which can be created and are accessible to all programs on the computer system. We define at computer startup logical names which specify the external data sources which are available on the installation. The service routines check these logical name definitions, and only allow the developer to access data in systems indicated by the logical names. This allows the same code to be used on installations with different external data sources.

7. Block Types and Timing Function Types

Because we use a static memory allocation, the SMA contains the same storage spaces for each block. The type of block determines what parameters need to be in the SMA for that block. Similarly, the timing function specified determines what timing parameters need to be in the SMA for that block.

When a block storage space in the SMA is first used, the first parameter that must be specified is the block type. This is the basic parameter which determines the meaning of all other data in the SMA for that block. The block type is stored as a character value, although an integer code would work equally well.

The block type cannot be changed, except by completely freeing the block storage and clearing the old block type. Once the type is specified, the service routines know what parameters are allowed and where in the SMA they should be stored. Similarly, the timing function for a block is specified by storing an integer code in the SMA, which then determines for the SMA services which timing parameters are needed.

8. Block Status

A block status is maintained in the SMA for all blocks. The block status indicates whether a block is properly configured, and whether the block is on, off, etc. The block status is stored as a character value. This allows some flexibility in indicating special cases of block status by developers. For example, a developer can change an "ON" status to "ON - special info" without affecting the block's action, where "special info" is character data useful to the developer.

9. Real-time Control Program

The real-time control program carries out module functions. It comprises a main loop routine, and a number of subroutines for carrying out the various module functions as well as timing functions. The loop repeats continuously until interrupted. The program contains logic to repeat its cycle at a time interval which is stored in the SMA, allowing it to be changed.

On each cycle, the program scans all blocks. Blocks which are not properly configured cannot be executed. For blocks which are configured and have any active status, the timing function is checked. If the timing function indicates that the block is due to execute, the corresponding routine for that type of block is called, and it is passed the identifier of the block.

The routine executes the block's function. The program then calls the user program for that block, which is the way we prefer to generate messages about block actions. (Initially, the batch supervisor 1500 is installed with all null user programs which can be replaced by the developer using the build-user program environment.) When all blocks have been checked, the program performs some housekeeping tasks, such as copying the SMA contents out the disk. It then waits in an idle state until the scheduled time of the next cycle.

The program contains only one copy of the procedure to execute the function for each module type and each timing function. When a block is scanned, the block type/timing function parameter in the SMA indicates which of these procedures to use. The procedures which carry out the block/timing functions retrieve the parameters stored in the SMA for use in carrying out the function. They use the service routines to access the SMA data. They also use the retrieval services to access data in external systems.

For custom block types—expert systems and user programs—the control program calls a routine whose name is derived from the block identifier. Initially, null routines are provided for all blocks. When a developer builds a custom module, a custom procedure is created and substituted for the null procedure for that block. The program must be relinked to use this new procedure.

The program uses shared flags to control its idle time between cycles. If any event flag is set, the program restarts from its idle state. The program sets a timer to trip one event flag. Other event flags can be set by other programs. When the timer flag is set, the program repeats its cycle. If any other event flag is set, the program branches and does a specific action for that flag, such as stopping in an orderly way. This prevents the program from being interrupted in mid-cycle.

10. Build-Supervisor Program

The build-supervisor program provides a template interface for the developer to enter module specifications into the SMA. The build-supervisor presents a different template to input data for each block type.

The templates are generated using the Forms Management System (FMS) software from Digital Equipment Corporation. Places on the form where data can be entered are called fields. The forms have a field for each parameter used by that block type. When data is entered into a field, the corresponding put function from the SMA services is called. If the request fails, the error message is displayed on the bottom of the form.

The build-supervisor also has functions which allow the developer to monitor both the supervisor and individual blocks in real time. The monitoring function retrieves the static and dynamic information from the SMA and displays it in continuously updating displays. The information displayed includes the relevant external data values used by the block, the time history of the block execution, relevant block parameter constants, and a short history of significant block actions.

The build-supervisor also has functions which allow the developer to branch out the forms interface to build user programs or to build an expert system rulebase.

11. Build-Expert Program

The build expert program is different from the build-supervisor. The build expert program generates code to implement a developer-specified rulebase, while the build-supervisor puts data into the SMA. The build-supervisor uses the pre-defined rule representation as described in our associated patent applications listed above.

The data entered into the rule forms for each rule type is stored in an indexed file. Each rule is one record in the file and can be directly accessed by referring to the rule name in the read request to the file. The build-expert also uses FMS software. Because rules are integral units, the rule input data is checked as a whole when rule entry is complete. Rule parameters are checked against the definitions of other rules in the rulebase files to avoid conflicts or unresolved references. The rule data is then written as a new or revised record into the indexed file.

When rulebase editing is complete, the indexed files are read and computer code is generated for each rule. We presently generate a single subroutine in Fortran. This works well for small and moderate size rulebases, and the modular nature of the supervisor encourages smaller rule-bases. For larger rulebases, additional efficiency could be achieved by generating the code for the rulebase in an object language like C++ (which is commercially available). Each rule could be coded as an instance of an object implementing the function for that rule type.

The rulebase computer code is compiled and replaces the null rulebase provided in the initial supervisor system. Compiled rulebase computer code is kept in a user object library. The realtime control program must be relinked to include this new rulebase procedure from the library.

12. Build-User Program Environment

The build-user program environment allows the developer to write code in Fortran and to implement it as either a stand-alone user program block, or as a followon user program to any other block type. Fortran is provided since most developers using the supervisor 1500 know this language, but any other compiled language would work.

The build-user program environment is much less structured than the other setup functions in the supervisor, so it does not use a forms interface to the developer. Instead, procedures running at the operating system command level (DCL) are used to provide menu driven access to standard text editor, compiler, librarian functions, and the link procedures needed to implement the user code. Compiled user code is kept in the user object library.

13. User Sharable Image

We prefer to link all user written computer code and expert systems into a separate sharable image file. This image cannot be executed by itself, since it has no entry point, but the real-time control program can be linked against it and can call the routines in it. A new user shareable image can be linked without relinking the whole real-time control program. The real-time control program will load the latest version of this image when it is started. Thus, to implement new user code, the user shareable image is relinked and the control program restarted. This reduces the turnaround time for implementing new user code and expert systems.

I claim:

1. An expert system based batch process control method, comprising the steps of:
   (a) initiating the batch process;
   (b) monitoring, using knowledge in the expert system which defines an endpoint condition in the batch process, for said endpoint condition; and
   (c) changing, using the expert system, a control objective of the batch process when the expert system detects said endpoint condition.

2. The expert system based batch process control method of claim 1, wherein step (a) comprises the step of:
   initiating said batch process in accordance with a command from a process operator.

3. The expert system based batch process control method of claim 2, wherein said initiating step further comprises:
   using a toggle on/off function of an event module in a modular supervisory control system.

4. The expert system based batch process control method of claim 1, wherein step (a) comprises the step of:
   initiating said batch process automatically when a previous step in said batch process reaches its endpoint.

5. The expert system based batch process control method of claim 4, wherein said initiating step further comprises the step of:
   causing an event module in a modular supervisory control system to execute.

6. The expert system based batch process control method of claim 1, wherein step (b) comprises the step of:
   cycling said expert system.

7. The expert system based batch process control method of claim 1, wherein step (b) further comprises the steps of:
   (i) executing said expert system;
   (ii) waiting an idle time; and
   (iii) executing said expert system after said idle time.

8. The expert system based batch process control method of claim 1, wherein step (b) further comprises the step of:
   (i) using an inference engine with said knowledge to detect said endpoint condition.

9. The expert system based batch process control method of claim 8, wherein step (i) further comprises the step of:
   using said knowledge in the form of decision-making knowledge about the domain.

10. The expert system based batch process control method of claim 8, wherein step (i) further comprises the step of:
    using said knowledge in the form of a group of rules around classes of objects.

11. The expert system based batch process control method of claim 8, wherein step (i) further comprises the step of:
    using said knowledge in the form of rules structured according to a limited set of predetermined types.

12. The expert system based batch process control method of claim 8, wherein step (i) further comprises the step of:
    using said knowledge in the form of at least one rule for representing knowledge about the domain.

13. The expert system based batch process control method of claim 1, wherein step (c) further comprises the step of:
    changing said control objective using changes encoded directly in said knowledge.

14. The expert system based batch process control method of claim 1, wherein step (c) further comprises:
    changing said control objective using a batch-type control system triggered by said expert system.

15. The expert system based batch process control method of claim 1, wherein step (c) further comprises the step of:
    changing said control objectives using a process operator in accordance with communication from said expert system.

16. The expert system based batch process control method of claim 1, wherein step (b) further comprises the step of:
    using said knowledge in an expert system module in a modular supervisory control system.

17. The expert system based batch process control method of claim 1, wherein step (b) further comprises the step of:
    using timing and sequencing functions to repeatedly execute an expert system module in a modular supervisory control system.

18. The expert system based batch process control method of claim 1, wherein step (c) further comprises the step of:
    using an explicit request in said knowledge to execute an event module in a modular supervisory control system.

19. A batch process control system, comprising:
    (a) control means for controlling process conditions of the batch process, so as to maintain said process conditions at pre-defined objectives; and
    (b) expert system means, responsive to said control means, for causing said control means to change said pre-defined objectives when an endpoint condition, defined by knowledge in said expert system means, is detected by said expert system means.

20. The batch process control system of claim 19, wherein said control means comprises:

a distributed control system.

21. The batch process control system of claim 20, wherein said expert system means is part of said distributed control system.

22. The batch process control system of claim 19, wherein said control means comprises:
a programmable logic controller.

23. The batch process control system of claim 19, wherein said control means comprises:
a single loop controller.

24. The batch process control system of claim 19, wherein said control means comprises:
a distributed control system, and
a supervisory controller supervising said distributed control system.

25. The batch process control system of claim 24, wherein said expert system means is part of said supervisory controller.

26. The batch process control system of claim 24, wherein said supervisory controller comprises:
an expert system module, and
feedback control module.

27. The batch process control system of claim 24, wherein said supervisory controller comprises:
an event module.

28. The batch process control system of claim 19, wherein said expert system means comprises:
a knowledge base, and
an inference engine responsive to said knowledge base.

29. The batch process control system of claim 28, wherein said knowledge base comprises:
decision-making knowledge about the domain.

30. The batch process control system of claim 28, wherein said knowledge base comprises:
a group of rules around classes of objects.

31. The batch process control system of claim 28, wherein said knowledge base comprises:
at least one rule for representing knowledge about the domain.

32. The batch process control system of claim 28, wherein said knowledge base comprises:
rules structured according to a limited set of predetermined types.

33. The batch process control system of claim 28, further comprising:
interface means for providing input data used in said knowledge base.

34. The batch process control system of claim 33, wherein said interface means receives said input data from a process measurement database.

35. The batch process control system of claim 33, wherein said interface means receives said input data from a process control system.

36. The batch process control system of claim 33, wherein said interface means comprises:
means for sending a request for a change to said control means.

37. The batch process control system of claim 33, wherein said interface means comprises:
terminal means having query and text display function.

38. The batch process control system of claim 19, wherein said expert system means comprises:
an expert system module residing in a supervisory controller.

39. The batch process control system of claim 19, wherein said expert system means comprises:
an expert system module in a modular supervisory process control system.

40. The batch process control system of claim 39, wherein said modular supervisory process control system further comprises:
template based rule editor means for configuring said expert system module.

41. The batch process control system of claim 40, wherein said template rule editor uses three pre-defined rule structures entered through forms.

42. The batch process control system of claim 19, wherein said expert system means is part of said control means.

43. A batch process control system, comprising:
(a) control means for controlling at least one process condition of the batch process, in accordance with a desired objective; and
(b) expert system means, responsive to said control means, for causing said control means to change said desired objective when an endpoint condition, defined by knowledge in said expert system means, is detected by said expert system means.

44. The batch process control system of claim 43, wherein said control means comprises:
a distributed control system.

45. The batch process control system of claim 44, wherein said expert system means is part of said distributed control system.

46. The batch process control system of claim 43, wherein said control means comprises:
a programmable logic controller.

47. The batch process control system of claim 43, wherein said control means comprises:
a single loop controller.

48. The batch process control system of claim 43, wherein said control means comprises:
a distributed control system, and
a supervisory controller supervising said distributed control system.

49. The batch process control system of claim 48, wherein said expert system means is part of said supervisory controller.

50. The batch process control system of claim 48, wherein said supervisory controller comprises:
an expert system module, and
feedback control module.

51. The batch process control system of claim 48, wherein said supervisory controller comprises:
an event module.

52. The batch process control system of claim 43, wherein said expert system means comprises:
a knowledge base, and
an inference engine responsive to said knowledge base.

53. The batch process control system of claim 52, wherein said knowledge base comprises:
decision-making knowledge about the domain.

54. The batch process control system of claim 52, wherein said knowledge base comprises:
a group of rules around classes of objects.

55. The batch process control system of claim 52, wherein said knowledge base comprises:
at least one rule for representing knowledge about the domain.

56. The batch process control system of claim 52, wherein said knowledge base comprises:
rules structured according to a limited set of predetermined types.

57. The batch process control system of claim 52, further comprising:
  interface means for providing input data used in said knowledge base.

58. The batch process control system of claim 57, wherein said interface means receives said input data from a process measurement database.

59. The batch process control system of claim 57, wherein said interface means receives said input data from a process control system.

60. The batch process control system of claim 57, wherein said interface means comprises:
  means for sending a request for a change to said control means.

61. The batch process control system of claim 57, wherein said interface means comprises:
  terminal means having query and text display function.

62. The batch process control system of claim 43, wherein said expert system means comprises:
  an expert system module residing in a supervisory controller.

63. The batch process control system of claim 43, wherein said expert system means comprises:
  an expert system module in a modular supervisory process control system.

64. The batch process control system of claim 63, wherein said modular supervisory process control system further comprises:
  template based rule editor means for configuring said expert system module.

65. The batch process control system of claim 64, wherein said template based rule editor uses three pre-defined rule structures entered through forms.

66. The batch process control system of claim 43, wherein said expert system means is part of said control means.

67. A batch process control system, comprising:
  (a) first event module means for changing a first condition of the batch process;
  (b) expert system module means having a plurality of rules defining an endpoint condition of the batch process and responsive to data from the batch process for detecting said endpoint condition; and
  (c) second event module means, responsive to said expert system means, for changing a second condition of the batch process, upon detection of said endpoint condition by said expert system means.

68. The process control system of claim 67, wherein said first condition of said first event module means comprises:
  a desired process control objective.

69. The process control system of claim 67, wherein said first condition of said first event module means comprises:
  a parameter used to control the batch process.

70. The batch process control system of claim 67, wherein said expert system means comprises:
  means for running said expert system means until said endpoint condition is detected.

71. The batch process control system of claim 67, wherein said first event module changes said first condition of a distributed control system.

72. The batch process control system of claim 67, wherein said first event module changes said first condition of a programmable logic controller.

73. The batch process control system of claim 67, wherein said first event module changes said first condition of a single loop controller.

74. The batch process control system of claim 67, further comprising:
  a statistical test module.

75. The batch process control system of claim 67, further comprising:
  a feedback control module.

76. The batch process control system of claim 67, further comprising:
  a feedforward control module.

77. The batch process control system of claim 67, wherein first event module means, said expert system module means, and said second event module means are part of a real-time control program.

78. The batch process control system of claim 77, wherein said real-time control program further comprises:
  modular timing and sequencing functions.

79. The batch process control system of claim 78, wherein said modular timing and sequencing functions control execution of said first event module means, said expert system module means, and said second event module means in accordance with module timing functions and parameters and/or in accordance requests for module execution.

80. The batch process control system of claim 67, wherein said first event module means is a batch supervisory module.

81. The batch process control system of claim 67, wherein said second event module means is a batch supervisory module.

82. The batch process control system of claim 67, wherein said first event module means comprises:
  event change module means for changing an analog target value.

83. The batch process control system of claim 67, wherein said first event module means comprises:
  event change module means for changing an digital target value.

84. The batch process control system of claim 67, wherein said second event module means comprises:
  event change module means for changing an analog target value.

85. The batch process control system of claim 67, wherein said second event module means comprises:
  event change module means for changing a digital target value.

86. The batch process control system of claim 67, wherein said first event module means comprises:
  event change module means for changing a target value to a pre-defined absolute value.

87. The batch process control system of claim 67, wherein said first event module means comprises:
  event change module means for changing a target value by a fixed amount.

88. The batch process control system of claim 67, wherein said first event module means comprises:
  event change module means for changing at least two target values.

89. The batch process control system of claim 67, wherein said second event module means comprises:
  event change module means for changing a target value to a pre-defined absolute value.

90. The batch process control system of claim 67, wherein said second event module means comprises:

event change module means for changing a target value by a fixed amount.

91. The batch process control system of claim 67, wherein said second event module means comprises:
event change module means for changing at least two target values.

92. The batch process control system of claim 67, further comprising feedback control module means for changing a recipe of the batch process, said recipe being in said first event module means.

93. The batch process control system of claim 92, further comprising means for changing a value of said recipe.

94. The batch process control system of claim 92, further comprising means for changing a time duration of said recipe.

95. The batch process control system of claim 67, further comprising feedback control module means for changing a recipe of the batch process, said recipe being in said second event module means.

96. The batch process control system of claim 95, further comprising means for changing a value of said recipe.

97. The batch process control system of claim 95, further comprising means for changing a time duration of said recipe.

98. The batch process control system of claim 67, further comprising real-time control program means for controling, in accordance with module timing and/or sequencing functions, the execution of said first event module means, said expert system module means, and/or said second event module means.

99. The batch process control system of claim 67, further comprising build-supervisor means for specifying using a template entry said first event module means, said expert system module means, and/or said second event module means.

100. A batch process control system, comprising:
(a) first event module means for changing a first condition of the batch process;
(b) second event module means for changing a second condition of the batch process;
(c) following domino timing function means for causing said second module means to execute when said first event module means turns off, for keeping said second event module means turned on for a specified execution time interval, and for turning said second event module means off after said specified execution time interval.

101. A batch process control system, comprising:
(a) first event module means for changing a first condition of the batch process;
(b) second event module means for changing a second condition of the batch process; and
(c) first domino timing function means for causing said first event module means to execute when said first event module is turned on, for keeping said first event module means turned on for a specified execution time interval, and for turning said first event module means off after said specified execution time interval.

* * * * *